(12) United States Patent
Fujisawa et al.

(10) Patent No.: US 11,804,066 B2
(45) Date of Patent: Oct. 31, 2023

(54) DETECTION DEVICE AND METHOD FOR DETECTING SHORT CIRCUIT OF DETECTION DEVICE

(71) Applicant: Japan Display Inc., Tokyo (JP)

(72) Inventors: Akihiko Fujisawa, Tokyo (JP); Takaaki Kono, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/969,025

(22) Filed: Oct. 19, 2022

(65) Prior Publication Data

US 2023/0130956 A1    Apr. 27, 2023

(30) Foreign Application Priority Data

Oct. 25, 2021 (JP) ................. 2021-174088

(51) Int. Cl.
*G06K 9/00* (2022.01)
*G06V 40/13* (2022.01)

(52) U.S. Cl.
CPC ............................ *G06V 40/1318* (2022.01)

(58) Field of Classification Search
CPC ............. G06V 40/1318; G06F 3/0446; H01L 27/14636
See application file for complete search history.

(56) References Cited

U.S. PATENT DOCUMENTS

| 2021/0209326 A1* | 7/2021 | Cao | G06V 40/1318 |
| 2021/0240962 A1* | 8/2021 | Abe | H01L 27/14636 |
| 2022/0066586 A1* | 3/2022 | Chuang | G06F 3/0446 |

FOREIGN PATENT DOCUMENTS

JP    2006-085559 A    3/2006

* cited by examiner

*Primary Examiner* — Abdul-Samad A Adediran
(74) *Attorney, Agent, or Firm* — K&L Gates LLP

(57) ABSTRACT

A detection device includes a plurality of detection elements arranged in a matrix having a row-column configuration in a detection area of a substrate, and an initialization circuit configured to apply an initialization potential to each of the detection elements. The initialization circuit has a first mode to apply a same initialization potential to all the detection elements and a second mode to apply different initialization potentials to the detection elements adjacent to each other.

16 Claims, 16 Drawing Sheets

DETECTION DEVICE AND METHOD FOR DETECTING SHORT CIRCUIT OF DETECTION DEVICE

CROSS-REFERENCE TO RELATED APPLICATION

This application claims the benefit of priority from Japanese Patent Application No. 2021-174088 filed on Oct. 25, 2021, the entire contents of which are incorporated herein by reference.

BACKGROUND

1. Technical Field

The present invention relates to a detection device and a method for detecting a short circuit of a detection device.

2. Description of the Related Art

Optical detection devices are known in which a plurality of detection elements including photoelectric conversion elements such as positive-intrinsic-negative (PIN) photodiodes are arranged in a detection area on a substrate. Such an optical detection device is used as, for example, a biometric sensor, such as a fingerprint sensor or a vein sensor, that detects biological information. The related technologies are described, for example, in Japanese Patent Application Laid-open Publication No. 2006-085559.

In a manufacturing process of the substrate, a short circuit may occur between the adjacent detection elements in the detection area or in a wiring path to a detection circuit.

It is an object of the present invention to provide a detection device and a method for detecting a short circuit of a detection device that are capable of accurately detecting the short circuit occurring, for example, in the manufacturing process of the substrate, and thus are capable of leading to an improvement in quality.

SUMMARY

A detection device according to an embodiment of the present disclosure includes a plurality of detection elements arranged in a matrix having a row-column configuration in a detection area of a substrate, and an initialization circuit configured to apply an initialization potential to each of the detection elements. The initialization circuit has a first mode to apply a same initialization potential to all the detection elements and a second mode to apply different initialization potentials to the detection elements adjacent to each other.

A method according to an embodiment for detecting a short circuit of a detection device including a plurality of detection elements arranged in a matrix having a row-column configuration in a detection area of a substrate is disclosed. The method includes a first step of applying a first potential to the detection elements arranged in even-numbered columns, applying a second potential different from the first potential to the detection elements arranged in odd-numbered columns, and storing detection values at the detection elements, and a second step of determining a short circuit of the substrate based on the detection values.

A method according to an embodiment for detecting a short circuit of a detection device including a plurality of detection elements arranged in a matrix having a row-column configuration in a detection area of a substrate is disclosed. The method includes a first step of applying a first potential to the detection elements arranged in even-numbered rows, applying a second potential different from the first potential to the detection elements arranged in odd-numbered rows, and storing detection values at the detection elements, and a second step of determining a short circuit of the substrate based on the detection values.

DETAILED DESCRIPTION

Figure 1:
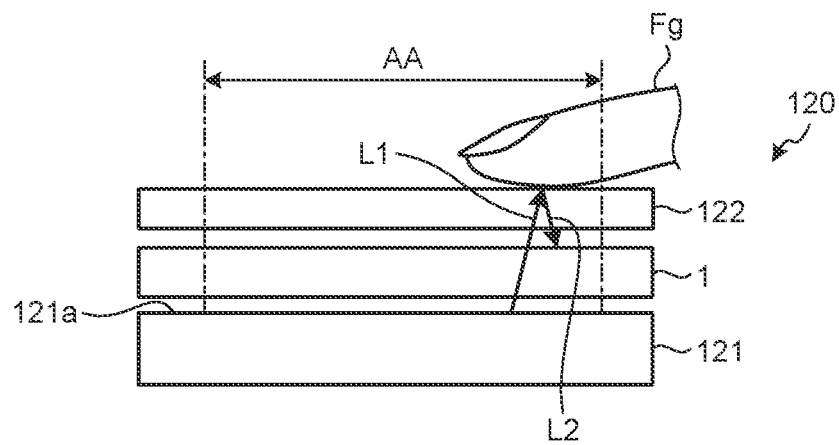
FIG. 1 is a sectional view illustrating a schematic sectional configuration of a detection apparatus having an illumination device, the detection apparatus including a detection device according to an embodiment of the present invention.

The following describes modes (embodiments) for carrying out the present invention in detail with reference to the drawings. The present invention is not limited to the description of the embodiments given below. Components described below include those easily conceivable by those skilled in the art or those substantially identical thereto. In addition, the components described below can be combined as appropriate. What is disclosed herein is merely an example, and the present invention naturally encompasses appropriate modifications easily conceivable by those skilled in the art while maintaining the gist of the invention. To further clarify the description, the drawings may schematically illustrate, for example, widths, thicknesses, and shapes of various parts as compared with actual aspects thereof. However, they are merely examples, and interpretation of the present invention is not limited thereto. The same component as that described with reference to an already mentioned drawing is denoted by the same reference numeral through the description and the drawings, and detailed description thereof may not be repeated where appropriate.

FIG. 1 is a sectional view illustrating a schematic sectional configuration of a detection apparatus having an illumination device, the detection apparatus including a detection device according to an embodiment of the present invention. As illustrated in FIG. 1, a detection apparatus 120 having an illumination device includes a detection device 1, an illumination device 121, and a cover glass 122. The illumination device 121, the detection device 1, and the cover glass 122 are stacked in this order in a direction orthogonal to a surface of the detection device 1.

The illumination device 121 has a light-emitting surface 121a for emitting light, and emits light L1 from the light-emitting surface 121a toward the detection device 1. The illumination device 121 is a backlight. The illumination device 121 may be, for example, what is called a side light-type backlight that includes a light guide plate provided in a position corresponding to a detection area AA and a plurality of light sources arranged at one end or both ends of the light guide plate. For example, light-emitting diodes (LEDs) for emitting light in a predetermined color are used as the light sources. The illumination device 121 may be what is called a direct-type backlight that includes the light sources (such as the LEDs) provided directly below the detection area AA. The illumination device 121 is not limited to the backlight, and may be provided on a lateral side or an upper side of the detection device 1, and may emit the light L1 from the lateral side or the upper side of a finger Fg.

The detection device 1 is provided so as to face the light-emitting surface 121a of the illumination device 121. The light L1 emitted from the illumination device 121 passes through the detection device 1 and the cover glass 122. The detection device 1 is, for example, a light-receptive biometric sensor, and can detect asperities (such as a fingerprint) on a surface of the finger Fg by detecting light L2 reflected on the surface of the finger Fg. Alternatively, the detection device 1 may detect information on a living body by detecting the light L2 reflected inside the finger Fg in addition to detecting the fingerprint. Examples of the information on the living body include a blood vessel image, pulsation, and a pulse wave of, for example, a vein. The color of the light L1 from the illumination device 121 may be varied according to a detection target. Not only a fingertip but also other biological body parts such as a palm, a wrist, and a sole can be employed as an object to be detected.

The cover glass 122 is a member for protecting the detection device 1 and the illumination device 121, and covers the detection device 1 and the illumination device 121. The cover glass 122 is, for example, a glass substrate. The cover glass 122 is not limited to a glass substrate, and may be, for example, a resin substrate. The cover glass 122 need not be provided. In this case, the surface of the detection device 1 is provided with a protective layer, and the finger Fg contacts the protective layer of the detection device 1.

The detection apparatus 120 having an illumination device may be provided with a display panel instead of the illumination device 121. The display panel may be, for example, an organic electroluminescent (EL) (organic light-emitting diode (OLED)) display panel or an inorganic EL (micro-LED or mini-LED) display. Alternatively, the display panel may be a liquid crystal display (LCD) panel using liquid crystal elements as display elements or an electrophoretic display (EPD) panel using electrophoretic elements as display elements. Also, in this case, display light emitted from the display panel passes through the detection device 1, and the fingerprint of the finger Fg and the information on the living body can be detected based on the light L2 reflected by the finger Fg.

Figure 2:
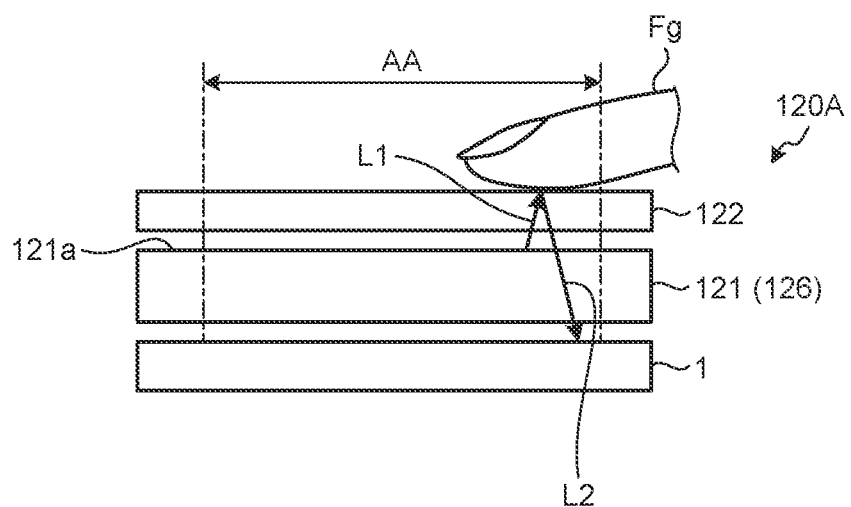
FIG. 2 is a sectional view illustrating a schematic sectional configuration of a detection apparatus having an illumination device according to a modification.

FIG. 2 is a sectional view illustrating a schematic sectional configuration of a detection apparatus having an illumination device according to a modification. As illustrated in FIG. 2, in the detection apparatus 120 having an illumination device, the detection device 1, the illumination device 121, the cover glass 122 are stacked in this order in the direction orthogonal to the surface of the detection device 1. Also, in the present modification, a display panel such as an organic EL display panel 126 can be employed instead of the illumination device 121.

The light L1 emitted from the illumination device 121 passes through the cover glass 122, and then, is reflected by the finger Fg. The light L2 reflected by the finger Fg passes through the cover glass 122, and further passes through the illumination device 121. The detection device 1 can perform the detection of the information on the living body such as the fingerprint detection by receiving the light L2 that has passed through the illumination device 121.

Figure 3:
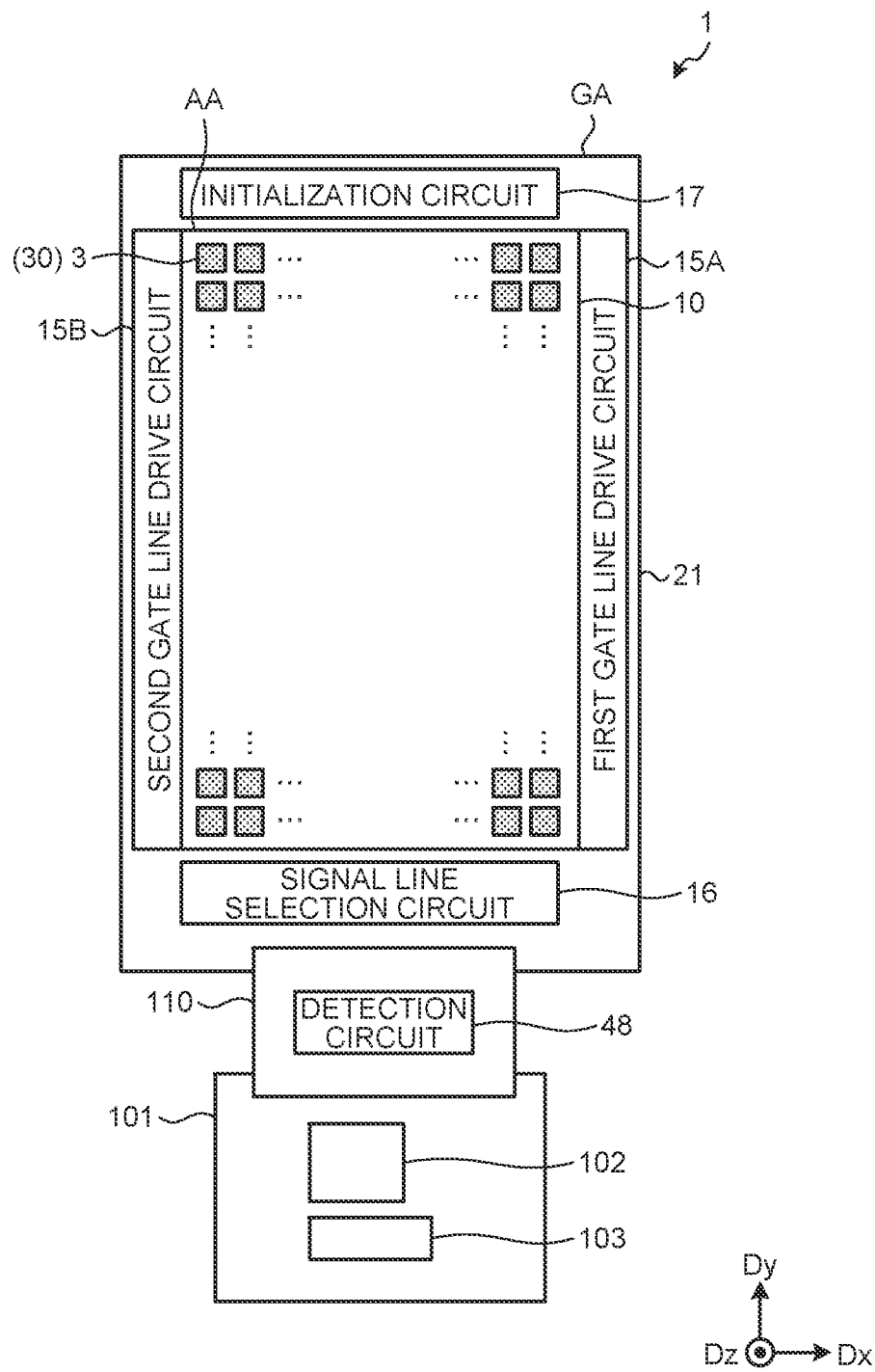
FIG. 3 is a plan view illustrating the detection device according to the embodiment.

FIG. 3 is a plan view illustrating the detection device according to the embodiment. As illustrated in FIG. 3, the detection device 1 includes a substrate 21, a sensor unit 10, a first gate line drive circuit 15A, a second gate line drive circuit 15B, a signal line selection circuit 16, an initialization circuit 17, a detection circuit 48, a control circuit 102, and a power supply circuit 103.

The substrate 21 is electrically coupled to a control substrate 101 through a wiring substrate 110. The wiring substrate 110 is, for example, a flexible printed circuit board or a rigid circuit board. The wiring substrate 110 is provided with the detection circuit 48. The control substrate 101 is provided with the control circuit 102 and the power supply circuit 103. The control circuit 102 is, for example, a field-programmable gate array (FPGA). The control circuit 102 supplies control signals to the sensor unit 10, the first gate line drive circuit 15A, the second gate line drive circuit 15B, and the signal line selection circuit 16 to control a detection operation of the sensor unit 10. The power supply circuit 103 supplies voltage signals including, for example, a power supply potential Vsf and a reference potential Vcom (refer to FIG. 5) to the sensor unit 10, the first gate line drive circuit 15A, the second gate line drive circuit 15B, and the signal line selection circuit 16.

The substrate 21 has the detection area AA and a peripheral area GA. The detection area AA is an area overlapping a plurality of detection elements 3 included in the sensor unit 10. The peripheral area GA is an area outside the detection area AA, and is an area not overlapping the detection elements 3. That is, the peripheral area GA is an area between the outer perimeter of the detection area AA and the ends of the substrate 21. The first gate line drive circuit 15A, the second gate line drive circuit 15B, and the signal line selection circuit 16 are provided in the peripheral area GA.

Each of the detection elements 3 of the sensor unit 10 is a photosensor including a photoelectric conversion element 30. The photoelectric conversion element 30 is a photodiode, and outputs an electrical signal corresponding to light irradiating each of the photoelectric conversion elements 30. More specifically, the photoelectric conversion element 30 is a positive-intrinsic-negative (PIN) photodiode. The detection elements 3 are arranged in a matrix having a row-column configuration in the detection area AA. The photoelectric conversion element 30 included in each of the detection elements 3 performs the detection according to gate drive signals (for example, a reset control signal RST and a read control signal RD) supplied from the first gate line drive circuit 15A and the second gate line drive circuit 15B. Each of the photoelectric conversion elements 30 outputs the electrical signal corresponding to the light irradiating the photoelectric conversion element 30 as a detection signal Vdet to the signal line selection circuit 16. The detection device 1 detects the information on the object to be detected located on the detection area based on the detection signals Vdet received from the detection elements 3.

The first gate line drive circuit 15A, the second gate line drive circuit 15B, the signal line selection circuit 16, and the initialization circuit 17 are provided in the peripheral area GA. Specifically, the first gate line drive circuit 15A and the second gate line drive circuit 15B are provided in areas extending along a second direction Dy in the peripheral area GA. The signal line selection circuit 16 is provided in an area extending along a first direction Dx in the peripheral area GA, and is provided between the sensor unit 10 and the detection circuit 48. The initialization circuit 17 is provided in an area extending along the first direction Dx in the peripheral area GA, and is provided above the sensor unit 10 (detection area AA). The first gate line drive circuit 15A and the second gate line drive circuit 15B are arranged with the detection area AA interposed therebetween in the first direction Dx. The first gate line drive circuit 15A and the second gate line drive circuit 15B are not limited to this configuration, and may be formed as one circuit and arranged along one side of the detection area AA. The initialization circuit 17 may be provided, for example, between the sensor unit 10 and the detection circuit 48. The present disclosure is not limited by the arrangement of the initialization circuit 17.

The first direction Dx is one direction in a plane parallel to the substrate 21. The second direction Dy is one direction in the plane parallel to the substrate 21, and is a direction orthogonal to the first direction Dx. The second direction Dy may non-orthogonally intersect the first direction Dx. A third direction Dz is a direction orthogonal to the first direction Dx and the second direction Dy, and is a direction normal to the substrate 21.

Figure 4:
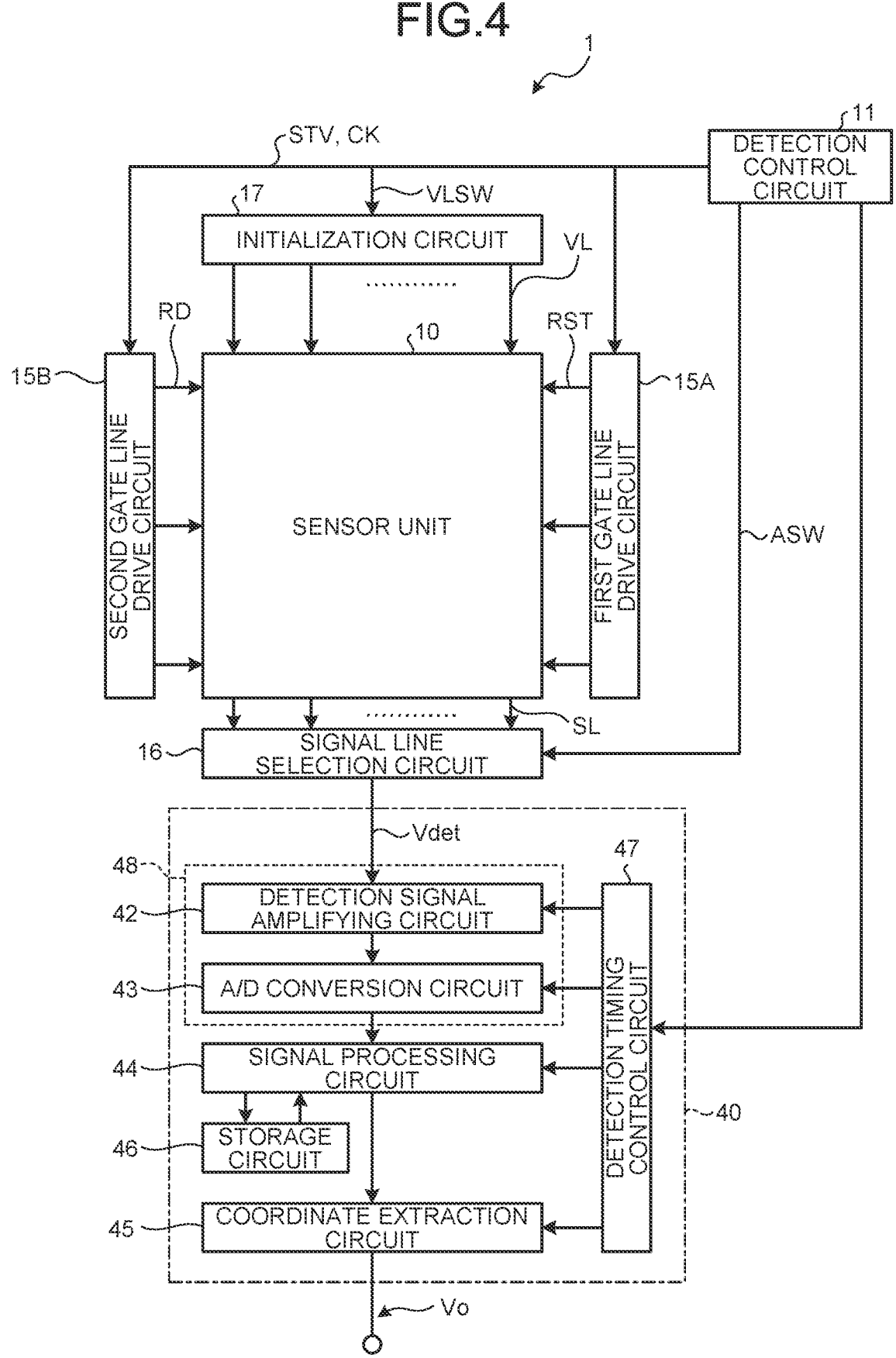
FIG. 4 is a block diagram illustrating a configuration example of the detection device according to the embodiment.

FIG. 4 is a block diagram illustrating a configuration example of the detection device according to the embodiment. As illustrated in FIG. 4, the detection device 1 further includes a detection control circuit 11 and a detector 40.

One, some, or all of the functions of the detection control circuit 11 are included in the control circuit 102. One, some, or all of the functions of the detector 40 other than those of the detection circuit 48 are also included in the control circuit 102.

The detection control circuit 11 is a circuit that supplies respective control signals to the first gate line drive circuit 15A, the second gate line drive circuit 15B, the signal line selection circuit 16, the initialization circuit 17, and the detector 40 to control operations thereof. The detection control circuit 11 supplies various control signals including, for example, a start signal STV and a clock signal CK to the first gate line drive circuit 15A and the second gate line drive circuit 15B. The detection control circuit 11 also supplies various control signals including, for example, a signal line selection signal ASW to the signal line selection circuit 16 during a detection period for performing detection processing. In the present disclosure, the detection control circuit 11 further provides various control signals including, for example, a reset potential selection signal VLSW to the initialization circuit 17.

The first gate line drive circuit 15A and the second gate line drive circuit 15B are circuits that drive a plurality of gate lines (read control scan lines GLrd and reset control scan lines GLrst (refer to FIG. 5)) based on the various control signals. The first gate line drive circuit 15A and the second gate line drive circuit 15B sequentially or simultaneously select the gate lines, and supply the gate drive signals (for example, the reset control signals RST or the read control signals RD) to the selected gate lines. Through this operation, the first gate line drive circuit 15A and the second gate line drive circuit 15B select the photoelectric conversion elements 30 coupled to the gate lines.

The signal line selection circuit 16 is a switch circuit that sequentially or simultaneously selects a plurality of output signal lines SL. The signal line selection circuit 16 is, for example, a multiplexer. The signal line selection circuit 16 couples the selected output signal lines SL to the detection circuit 48 based on the signal line selection signals ASW supplied from the detection control circuit 11. Through this operation, the signal line selection circuit 16 outputs the detection signals Vdet from the detection elements 3 to the detector 40. The signal line selection circuit 16 may be omitted. In this case, the output signal lines SL may be directly coupled to the detection circuit 48.

The initialization circuit 17 is a circuit that applies an initialization potential to reset potential lines VL based on the reset potential selection signal VLSW supplied from the detection control circuit 11. In the present disclosure, the initialization circuit 17 applies a first potential Vrst to the reset potential lines VL when a normal detection operation of the detection device 1 is performed, and selectively applies the first potential Vrst or a second potential VGH (second potential) higher than the first potential Vrst to the reset potential lines VL when a short-circuit detection operation of the detection device 1 (described later) is performed.

The detector 40 includes the detection circuit 48, a signal processing circuit 44, a coordinate extraction circuit 45, a storage circuit 46, and a detection timing control circuit 47. The detection timing control circuit 47 performs control to cause the detection circuit 48, the signal processing circuit 44, and the coordinate extraction circuit 45 to operate in synchronization with one another based on a control signal supplied from the detection control circuit 11.

The detection circuit 48 is, for example, an analog front-end (AFE) circuit. The detection circuit 48 is a signal processing circuit having functions of at least a detection signal amplifying circuit 42 and an analog-to-digital (A/D) conversion circuit 43. The detection signal amplifying circuit 42 amplifies the detection signal Vdet. The A/D conversion circuit 43 converts an analog signal output from the detection signal amplifying circuit 42 into a digital signal.

The signal processing circuit 44 is a logic circuit that detects a predetermined physical quantity received by the sensor unit 10 based on output signals of the detection circuit 48. The signal processing circuit 44 can detect the fingerprint that is the asperities on the surface of the finger Fg based on the signals from the detection circuit 48 when the finger Fg is in contact with or in proximity to a detection surface. The signal processing circuit 44 may detect the information on the living body based on the signals from the detection circuit 48. Examples of the information on the living body include the blood vessel image, the pulse wave, the pulsation, and a blood oxygen saturation level of the finger Fg. In the present embodiment, the detection device regards the finger Fg (fingerprint) as the object to be detected (detection target). However, the object to be detected is not limited to the finger Fg, and may be any part of the living body, such as the palm, the wrist, or the sole.

The storage circuit 46 temporarily stores therein signals calculated by the signal processing circuit 44. The storage circuit 46 may be, for example, a random-access memory (RAM) or a register circuit.

In the present disclosure, the signal processing circuit 44 has a function of storing a detection value at each of the detection elements 3 in the detection area AA in the storage circuit 46 when the short-circuit detection operation of the detection device 1 (described later) is performed. The detection value stored in the storage circuit 46 is read in short-circuit detection processing (described later).

The coordinate extraction circuit 45 is a logic circuit that obtains detected coordinates of the asperities on the surface of the finger Fg or the like when the contact or proximity of the finger Fg is detected by the signal processing circuit 44. The coordinate extraction circuit 45 is the logic circuit that also obtains detected coordinates of blood vessels of the finger Fg or the palm. The coordinate extraction circuit 45 combines the detection signals Vdet output from the respective detection elements 3 of the sensor unit 10 to generate two-dimensional information representing a shape of the asperities on the surface of the finger Fg or the like. The coordinate extraction circuit 45 may output the detection signals Vdet as sensor outputs Vo instead of calculating the detected coordinates.

Figure 5:
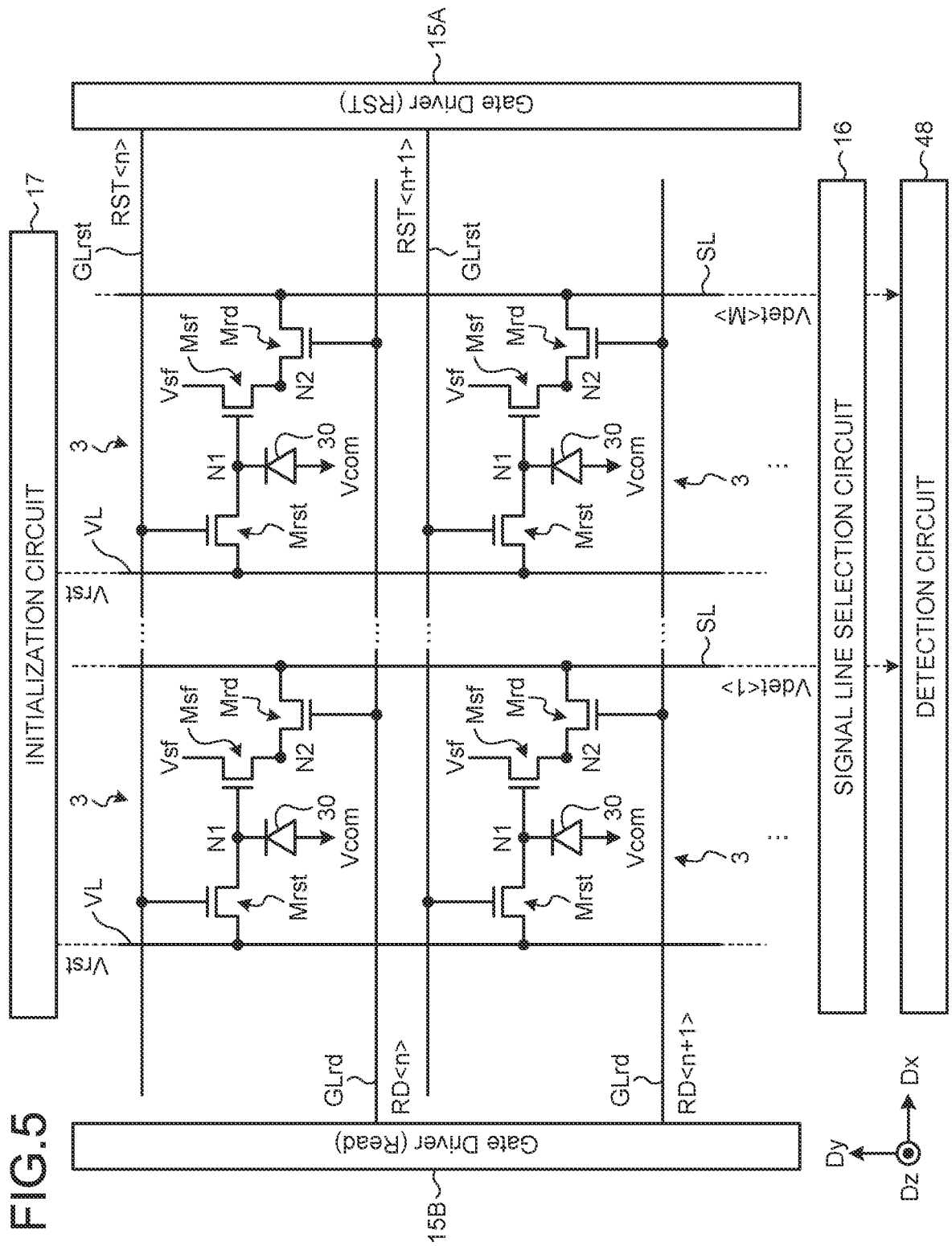
FIG. 5 is a circuit diagram illustrating a plurality of detection elements.

The following describes a circuit configuration example and an operation example of the detection device 1. FIG. 5 is a circuit diagram illustrating the detection elements. As illustrated in FIG. 5, each of the detection elements 3 includes the photoelectric conversion element 30, a reset transistor Mrst, a read transistor Mrd, and a source follower transistor Msf. The detection area AA is provided with the reset control scan lines GLrst and the read control scan lines GLrd as detection drive lines (gate lines), and provided with the output signal lines SL as wiring for reading signals.

The reset control scan lines GLrst, the read control scan lines GLrd, the output signal lines SL, and the reset potential lines VL are each coupled to the detection elements 3. Specifically, the reset control scan lines GLrst and the read control scan lines GLrd extend in the first direction Dx (refer to FIG. 3), and are each coupled to the detection elements 3 arranged in the first direction Dx. The output signal lines SL and the reset potential lines VL extend in the second direction Dy, and are coupled to the detection elements 3 arranged in the second direction Dy. The output signal lines SL are wiring that outputs the detection signals Vdet from the read transistors Mrd of the detection elements 3 arranged in the second direction Dy. The reset potential lines VL are wiring that supplies the first potential Vrst to the reset transistors Mrst of the detection elements 3 arranged in the second direction Dy when the normal detection operation of the detection device 1 is performed.

The reset transistor Mrst, the read transistor Mrd, and the source follower transistor Msf are provided correspondingly to each of the photoelectric conversion elements 30. Each of the transistors included in the detection element 3 is constituted by an n-type thin-film transistor (TFT). However, each of the transistors is not limited thereto, and may be constituted by a p-type TFT.

The reference potential Vcom is applied to the anode of the photoelectric conversion element 30. The cathode of the photoelectric conversion element 30 is coupled to a node N1. The node N1 is coupled to one of the source and the drain of the reset transistor Mrst, and to the gate of the source follower transistor Msf. When light irradiates the photoelectric conversion element 30, a signal (electric charge) output from the photoelectric conversion element 30 is stored in a capacitive element generated at the node N1.

The gate of the reset transistor Mrst is coupled to a corresponding one of the reset control scan lines GLrst. The other of the source and the drain of the reset transistor Mrst is supplied with the first potential Vrst from the initialization circuit 17 when the normal detection operation of the detection device 1 is performed. When the reset transistor Mrst is turned on (into a conduction state) in response to the reset control signal RST supplied from the first gate line drive circuit 15A, the potential of the node N1 is reset to the first potential Vrst. The reference potential Vcom has a potential (for example, at 2 V) lower than the first potential Vrst (for example, at 5 V), and the photoelectric conversion element 30 is driven in a reverse bias state by the potential difference between the first potential Vrst and the reference potential Vcom.

The source follower transistor Msf is coupled between a terminal supplied with the power supply potential Vsf and the read transistor Mrd (node N2). The gate of the source follower transistor Msf is coupled to the node N1. The gate of the source follower transistor Msf is supplied with a signal (voltage) corresponding to the signal (electric charge) generated by the photoelectric conversion element 30. This operation causes the source follower transistor Msf to output a signal voltage corresponding to the signal (electric charge) generated by the photoelectric conversion element 30 to the read transistor Mrd.

The read transistor Mrd is coupled between the source of the source follower transistor Msf (node N2) and a corresponding one of the output signal lines SL. The gate of the read transistor Mrd is coupled to a corresponding one of the read control scan lines GLrd. When the read transistor Mrd is turned on in response to the read control signal RD supplied from the second gate line drive circuit 15B, the signal output from the source follower transistor Msf, that is, the signal (voltage) corresponding to the signal (electric charge) generated by the photoelectric conversion element 30 is output as the detection signal Vdet to the output signal line SL. The detection signal Vdet output from each of the output signal lines SL is received by the detection circuit 48 through the signal line selection circuit 16.

In FIG. 5, the reset transistor Mrst and the read transistor Mrd each have a single-gate structure. However, the reset transistor Mrst and the read transistor Mrd may each have what is called a double-gate structure constituted by two transistors coupled in series, or may each have a configuration constituted by three or more transistors coupled in series. The circuit of each of the detection elements 3 is not limited to the configuration including the three transistors of the reset transistor Mrst, the source follower transistor Msf, and the read transistor Mrd. The detection element 3 may have two transistors or four or more transistors.

Figure 6:
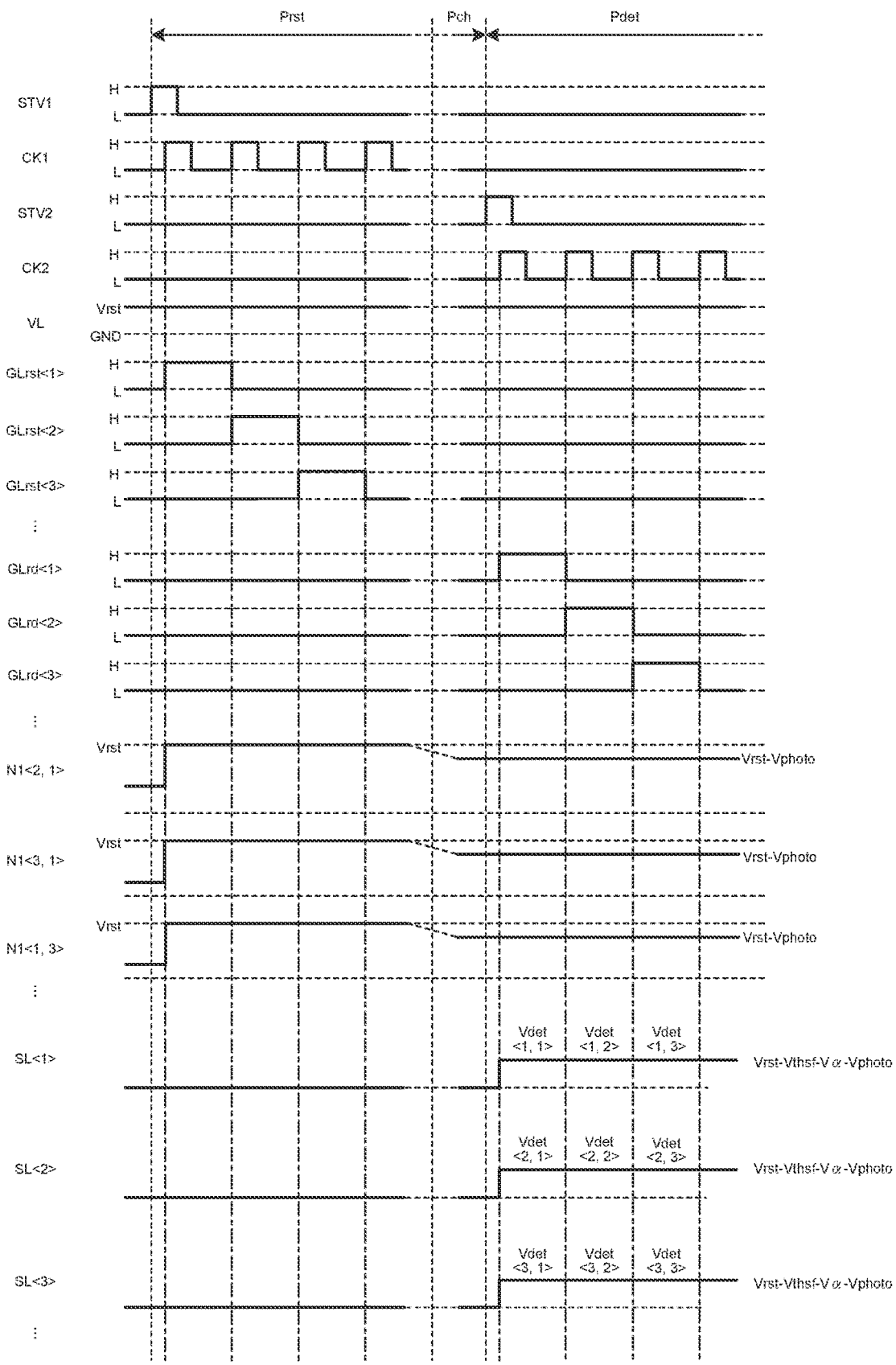
FIG. 6 is a diagram illustrating an exemplary timing diagram during a normal detection operation (first mode) of the detection device according to the embodiment.

FIG. 6 is a diagram illustrating an exemplary timing diagram during the normal detection operation (first mode) of the detection device according to the embodiment. As illustrated in FIG. 6, the detection element 3 performs the detection in the order of a reset period Prst, a storage period Pch, and a read period Pdet during the normal detection operation of the detection device 1. The power supply circuit 103 supplies the reference potential Vcom to the anode of the photoelectric conversion element 30 over the reset period Prst, the storage period Pch, and the read period Pdet. The initialization circuit 17 supplies the first potential Vrst supplied from the power supply circuit 103 to the reset transistor Mrst. In FIGS. 4 and 5, the initialization circuit 17 is provided in a position facing the signal line selection circuit 16 with the detection area AA interposed therebetween, but may be provided on the same side as the signal line selection circuit 16 with respect to the detection area AA.

The control circuit 102 sets a reset start signal STV1 to "H" (high-level voltage) to start the reset period Prst. In the reset period Prst, the control circuit 102 supplies a reset clock signal CK1 to sequentially set the reset control scan lines GLrst<1>, GLrst<2>, GLrst<3>, . . . to "H" (high-level voltage). This operation sequentially turns on the reset transistor Mrst of each of the detection elements 3 (into the conduction state) to increase the potential of the node N1 to the first potential Vrst. At this time, the photoelectric conversion element 30 is reverse-biased by the potential difference between the first potential Vrst and the reference potential Vcom. The read transistor Mrd is off (in a nonconduction state). Hence, the source of the source follower transistor Msf is charged by the power supply potential Vsf to increase the potential of the node N2.

The storage period Pch starts after the reset period Prst. In the storage period Pch, the reset transistor Mrst is turned off (into the nonconduction state). The signal corresponding to the light irradiating the photoelectric conversion element 30 is stored to reduce the potential of the node N1 to (Vrst−Vphoto). Vphoto denotes a signal (voltage change amount) corresponding to the light irradiating the photoelectric conversion element 30.

After the storage period Pch, the control circuit 102 sets a read start signal STV2 to "H" (high-level voltage) to start the read period Pdet. In the read period Pdet, the control circuit 102 supplies a read clock signal CK2 to sequentially set the read control scan lines GLrd<1>, GLrd<2>, GLrd<3>, . . . to "H" (high-level voltage). This operation sequentially turns on the read transistors Mrd of the respective detection elements 3 (into the conduction state) to read the detection signals Vdet<m, n> through the output signal lines SL<1>, SL<2>, SL<3>, . . . . Specifically, the detection signals Vdet<1,1>, Vdet<2,1>, Vdet<3,1>, . . . are read during a period when the read control scan line GLrd<1> is at "H" (high-level voltage); the detection signals Vdet<1,2>, Vdet<2,2>, Vdet<3,2>, . . . are read during a period when the read control scan line GLrd<2> is at "H" (high-level voltage); and the detection signals Vdet<1,3>, Vdet<2,3>, Vdet<3,3>, . . . are read during a period when the read control scan line GLrd<3> is at "H" (high-level voltage).

At this time, the potential of each of the detection signals Vdet<m, n> read by the detection circuit 48 is (Vrst−Vphoto), and the potential of the node N2 is reduced from the potential of the node N1 (Vrst−Vphoto) to (Vrst−Vthsf−Vα−Vphoto) by a threshold voltage Vthsf of the source follower transistor Msf and a potential drop Vα caused by on-resistance of the read transistor Mrd and wiring resistance of the output signal line SL.

Figure 7:
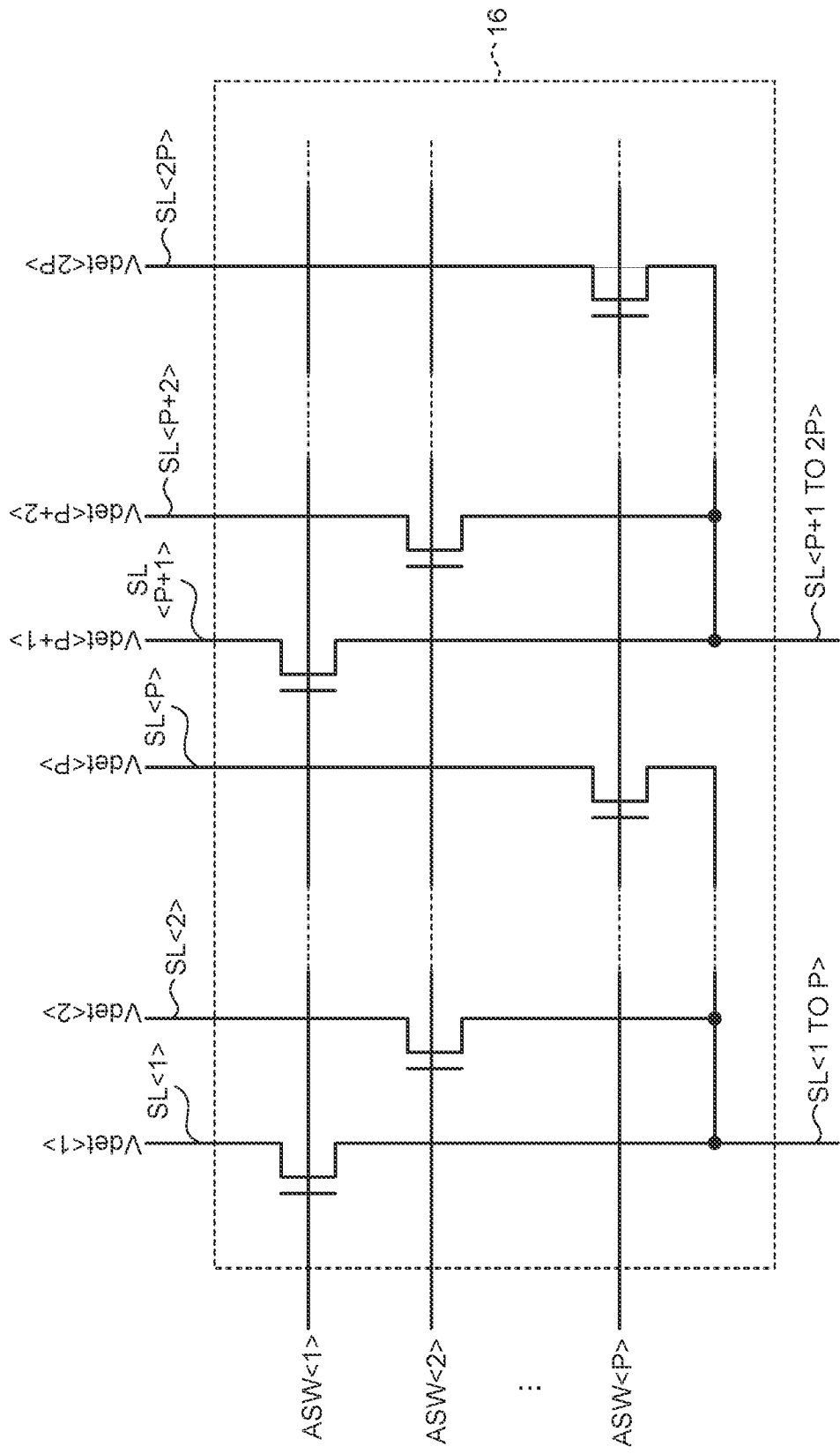
FIG. 7 is a diagram illustrating a configuration example of a signal line selection circuit.
Figure 8:
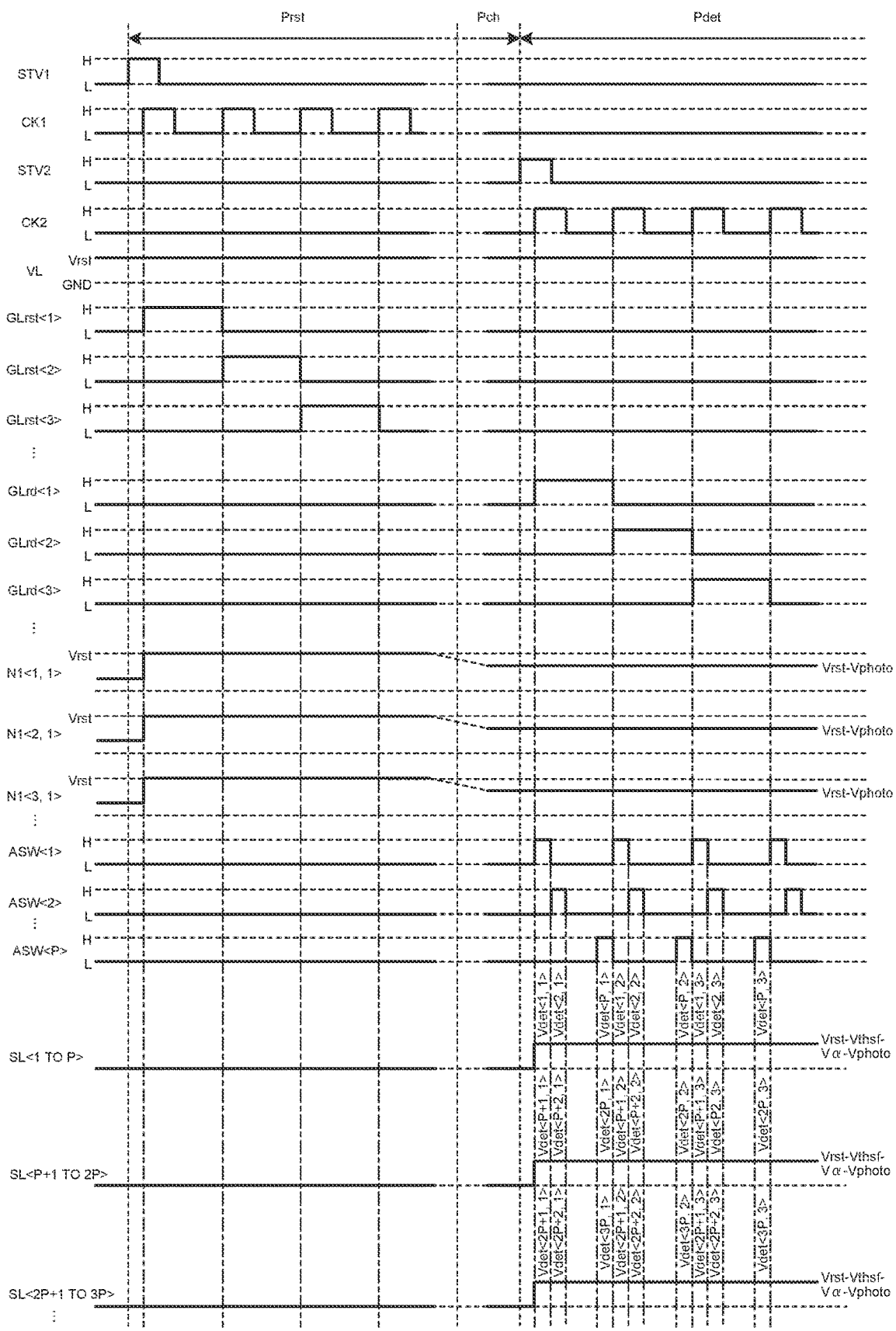
FIG. 8 is a diagram illustrating an exemplary timing diagram during the normal detection operation of the detection device according to the embodiment.

FIG. 7 is a diagram illustrating a configuration example of the signal line selection circuit. FIG. 8 is a diagram illustrating an exemplary timing diagram during the normal detection operation of the detection device according to the embodiment. FIG. 8 illustrates a timing diagram in a configuration including the signal line selection circuit 16 illustrated in FIG. 7.

In the example illustrated in FIGS. 7 and 8, the control circuit 102 temporally divides a period when the read control scan lines GLrd<n> are at "H" (high-level voltage) into P periods (where P is an integer of two or larger) in the read period Pdet, and sequentially sets the signal line selection signals ASW<1>, ASW<2>, . . . , ASW<P> to "H" (high-level voltage) in the period when the read control scan lines GLrd<n> are at "H" (high-level voltage). This operation sequentially turns on the transistors in the signal line selection circuit 16 (into the conduction state) to read the detection signals Vdet<m, n>. Specifically, the detection signals Vdet<1, 1>, Vdet<P+1, 1>, Vdet<2P+1, 1>, . . . are read during a period when the read control scan line GLrd<1> and the signal line selection signal ASW<1> are at "H" (high-level voltage); the detection signals Vdet<2, 1>, Vdet<P+2, 1>, Vdet<2P+2, 1>, . . . are read during a period when the read control scan line GLrd<1> and the signal line selection signal ASW<2> are at "H" (high-level voltage); and the detection signals Vdet<P, 1>, Vdet<2P, 1>, Vdet<3P, 1>, . . . are read during a period when the read control scan line GLrd<1> and the signal line selection signal ASW<P> are at "H" (high-level voltage). A configuration can also be employed in which each of the detection signals Vdet is read without passing through the signal line selection circuit 16. More specifically, in such a configuration, the same number of analog front-end (AFE) circuits as that of the output signal lines SL are provided in the detection circuit 48, and the output signal lines SL are coupled to the AFE circuits on a one-to-one basis.

The detection elements 3 and pieces of wiring are very densely arranged in the detection area AA. Therefore, short circuits may occur in the manufacturing process of the substrate 21 between the adjacent detection elements 3 and between the output signal lines SL in the path to the detection circuit 48. The following describes a configuration and the short-circuit detection processing that can detect the short circuits between the adjacent elements and the adjacent pieces of wiring in the detection device 1 according to the present disclosure.

First Embodiment

Figure 9:
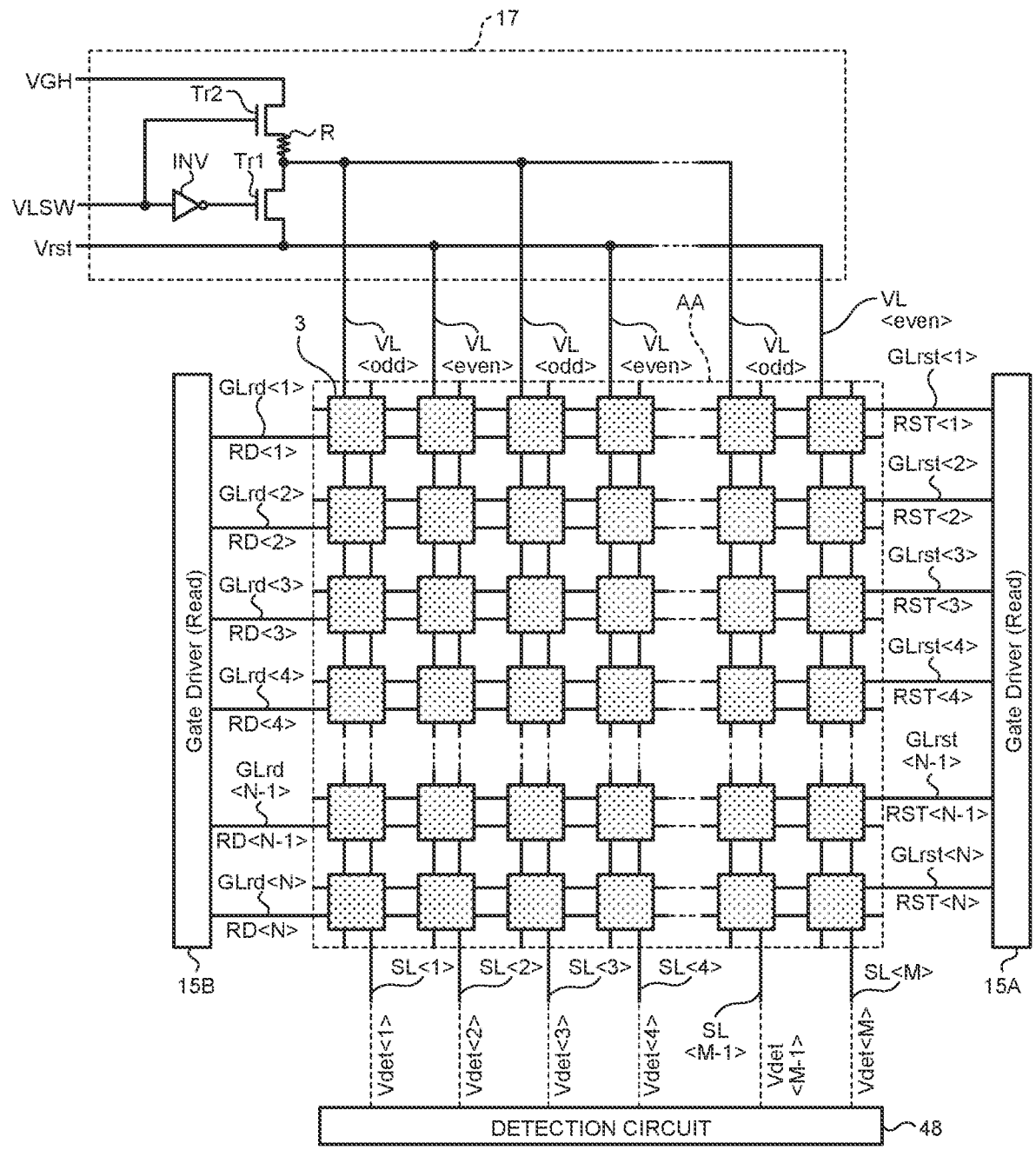
FIG. 9 is a diagram illustrating a configuration of an initialization circuit and a coupling example of reset potential lines according to a first embodiment of the present invention.
Figure 10:
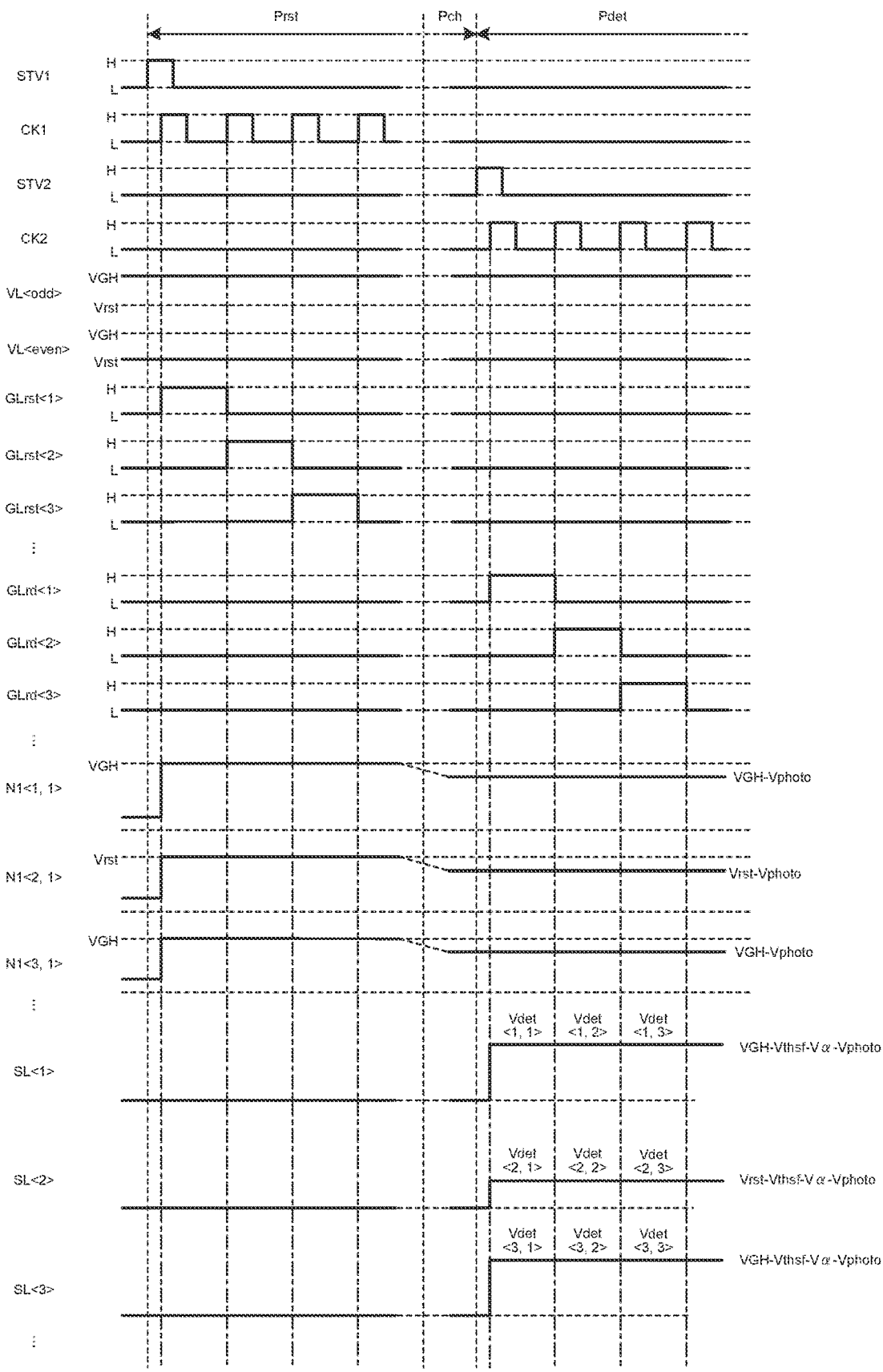
FIG. 10 is a diagram illustrating an exemplary timing diagram when a short circuit does not occur during a short-circuit detection operation (second mode) of the detection device according to the first embodiment.
Figure 11:
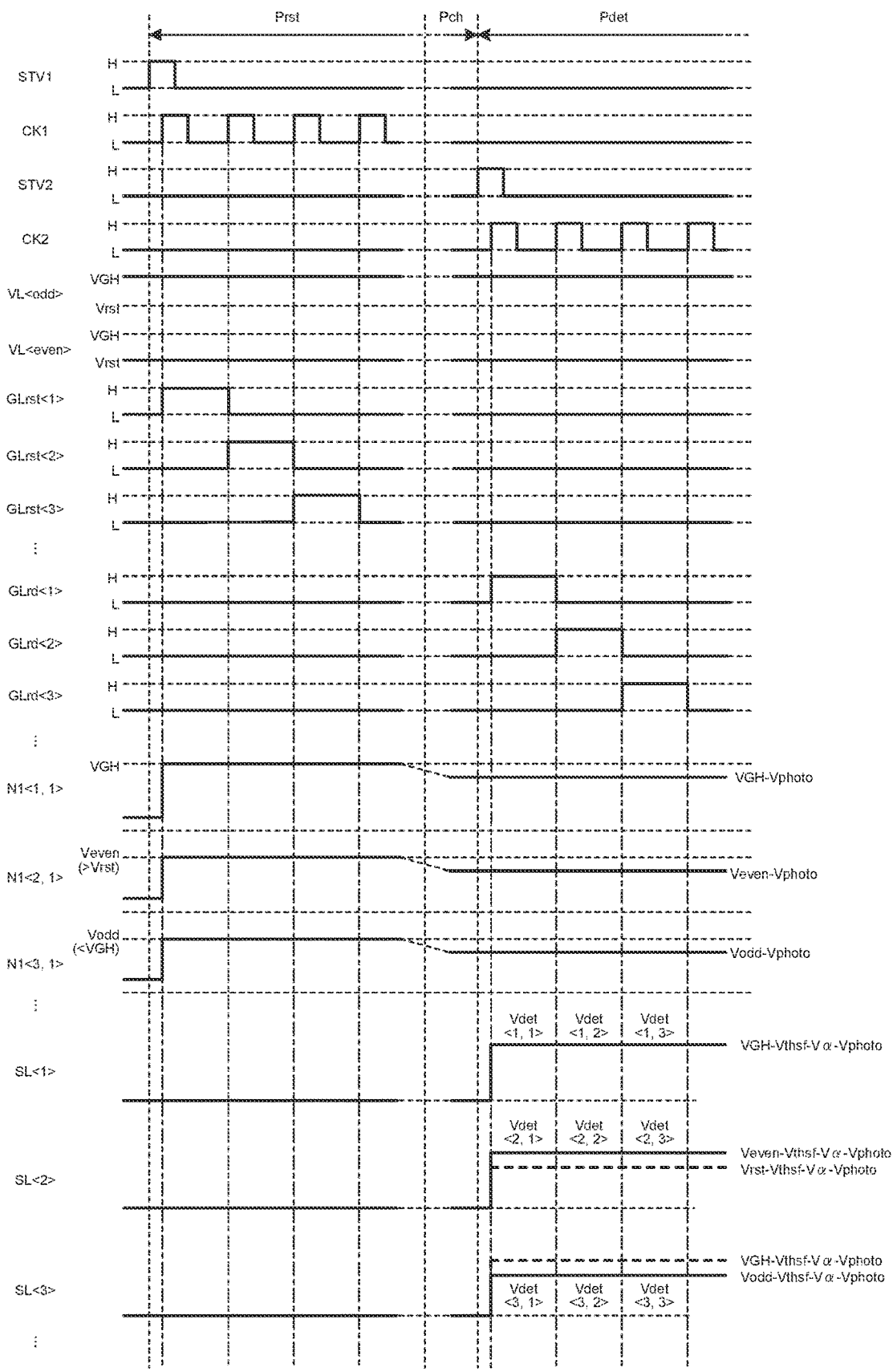
FIG. 11 is a diagram illustrating an exemplary timing diagram when the short circuit occurs during the short-circuit detection operation (second mode) of the detection device according to the first embodiment.

In a first embodiment of the present invention, an aspect will be described in which the short circuits are detected between the detection elements 3 adjacent in the first direction Dx and between the output signal lines SL. FIG. 9 is a diagram illustrating a configuration of the initialization circuit and a coupling example of the reset potential lines according to the first embodiment. FIG. 10 is a diagram illustrating an exemplary timing diagram when a short circuit does not occur during the short-circuit detection operation (second mode) of the detection device according to the first embodiment. FIG. 11 is a diagram illustrating an exemplary timing diagram when the short circuit occurs during the short-circuit detection operation (second mode) of the detection device according to the first embodiment. Specifically, FIG. 11 illustrates an example in which the short circuit occurs between the detection element 3<2, 1> (detection element in the second column of the first row) and the detection element 3<3, 1> (detection element in the third column of the first row) that are adjacent to each other.

As illustrated in FIG. 9, the initialization circuit 17 applies the first potential Vrst (for example, at 5 V) to the reset potential lines VL<even> in even-numbered columns. The initialization circuit 17 includes a first transistor Tr1 that applies the first potential Vrst (first potential) to the reset potential lines VL<odd> in odd-numbered columns, a second transistor Tr2 that applies the second potential VGH (for example, at 10 V) higher than the first potential Vrst to the reset potential lines VL<odd> in the odd-numbered columns, and a logic inversion circuit INV that inverts the control logic between the first transistor Tr1 and the second transistor Tr2. The first potential Vrst and the second potential VGH are supplied from the power supply circuit 103.

The second transistor Tr2 has, for example, a smaller channel width than that of the first transistor Tr1. As a result, an on-resistance R of the second transistor Tr2 increases. In an aspect of the present invention, the second transistor Tr2 may, for example, be provided with an external resistor R in the supply path of the second potential VGH (source or drain of the second transistor Tr2). Such an aspect causes the external resistor R to serve as a current-limiting resistor to reduce the load on the power supply circuit 103 when the short circuit occurs in the substrate 21.

As illustrated in FIG. 9, the initialization circuit 17 receives the reset potential selection signal VLSW. The gate of the second transistor Tr2 receives the reset potential selection signal VLSW, and the gate of the first transistor Tr1 receives a signal obtained by the logic inversion circuit INV by logically inverting the reset potential selection signal VLSW. In an aspect of the present invention, the reset potential selection signal VLSW may, for example, be output from the detection control circuit 11 (refer to FIG. 4).

The reset potential selection signal VLSW is controlled to be "L" (low-level voltage) during the normal detection operation of the detection device 1. This operation applies the first potential Vrst to all the detection elements 3 to initialize the potential of the nodes N1 of all the detection elements 3 to the first potential Vrst during the reset period Prst. The state where the initialization circuit 17 is set into such a state is called the first mode (refer to FIG. 6 for the timing diagram of the detection device in the first mode).

In the present embodiment, the reset potential selection signal VLSW is controlled to be "H" (high-level voltage) during the entire period of the short-circuit detection operation, as illustrated in FIGS. 10 and 11. This operation applies the second potential VGH to the detection elements 3 in the odd-numbered columns, and applies the first potential Vrst to the detection elements 3 in the even-numbered columns. The state where the initialization circuit 17 is set into such a state is called the second mode (refer to FIG. 10 (or FIG. 11) for the timing diagram of the detection device in the second mode).

During the short-circuit detection operation (second mode) according to the first embodiment, the detection area AA is uniformly irradiated with a predetermined amount of light. If no short circuit occurs in the substrate 21, as illustrated in FIG. 10, during the reset period Prst, potentials N1<1, 1>, N1<3, 1>, . . . of the nodes N1 in the odd-numbered columns of the detection elements 3 are initialized to the second potential VGH, and potentials N1<2, 1>, . . . of the nodes N1 in the even-numbered columns of the detection elements 3 are initialized to the first potential Vrst. As a result, the potential of the detection signals Vdet<odd, n> of the detection elements 3<odd, n> coupled to the reset potential lines VL<odd> in the odd-numbered columns is set to (VGH−Vthsf−Vα−Vphoto), and the potential of the detection signals Vdet<even, n> of the detection elements 3<even, n> coupled to the reset potential lines VL<even> in the even-numbered columns is set to (Vrst−Vthsf−Vα−Vphoto). The potential of the detection signals Vdet<odd, n> of the detection elements 3<odd, n> in the odd-numbered columns differs from the potential of the detection signals Vdet<even, n> of the detection elements 3<even, n> in the even-numbered columns by a potential difference of (|Vdet<odd, n>−Vdet<even, n>|=|VGH−Vrst|≈5 V) between the second potential VGH (for example, at 10 V) and the first potential Vrst (for example, at 5 V).

In contrast, if a short circuit occurs, for example, between the detection elements 3<2, 1> and 3<3, 1> adjacent to each other in the first direction Dx, potentials N1<2, n>, . . . of the nodes N1 of the detection elements 3 in the second column are initialized to a potential Veven (>Vrst) higher than the first potential Vrst, and potentials N1<3, n>, . . . of the nodes N1 of the detection elements 3 in the third column are initialized to a potential Vodd (<VGH) lower than the second potential VGH, during the reset period Prst, as illustrated in FIG. 11. In this case, the potential of the detection signals Vdet<2, n> of the detection elements 3<2, n> in the second column is set to (Veven−Vthsf−Vα−Vphoto), which is higher than the potential (Vrst−Vthsf−Vα−Vphoto) obtained when no short circuit occurs between the detection elements 3<2, 1> and 3<3, 1>. In addition, the potential of the detection signals Vdet<3, n> of the detection elements 3<3, n> in the third column is set to (Vodd−Vthsf−Vα−Vphoto), which is lower than the potential (VGH−Vthsf−Vα−Vphoto) obtained when no short circuit occurs between the detection elements 3<2, 1> and 3<3, 1>. Furthermore, the potential difference between the potential of the detection signals Vdet<2, n> of the detection elements 3<2, n> in the second column and the potential of the detection signals Vdet<3, n> of the detection elements 3<3, n> in the third column is smaller than the potential difference obtained when no short circuit occurs between the detection elements 3<2, 1> and 3<3, 1>(|Vdet<2, n>−Vdet<3, n>|=|Vodd−Veven|<5 V).

Figure 12:
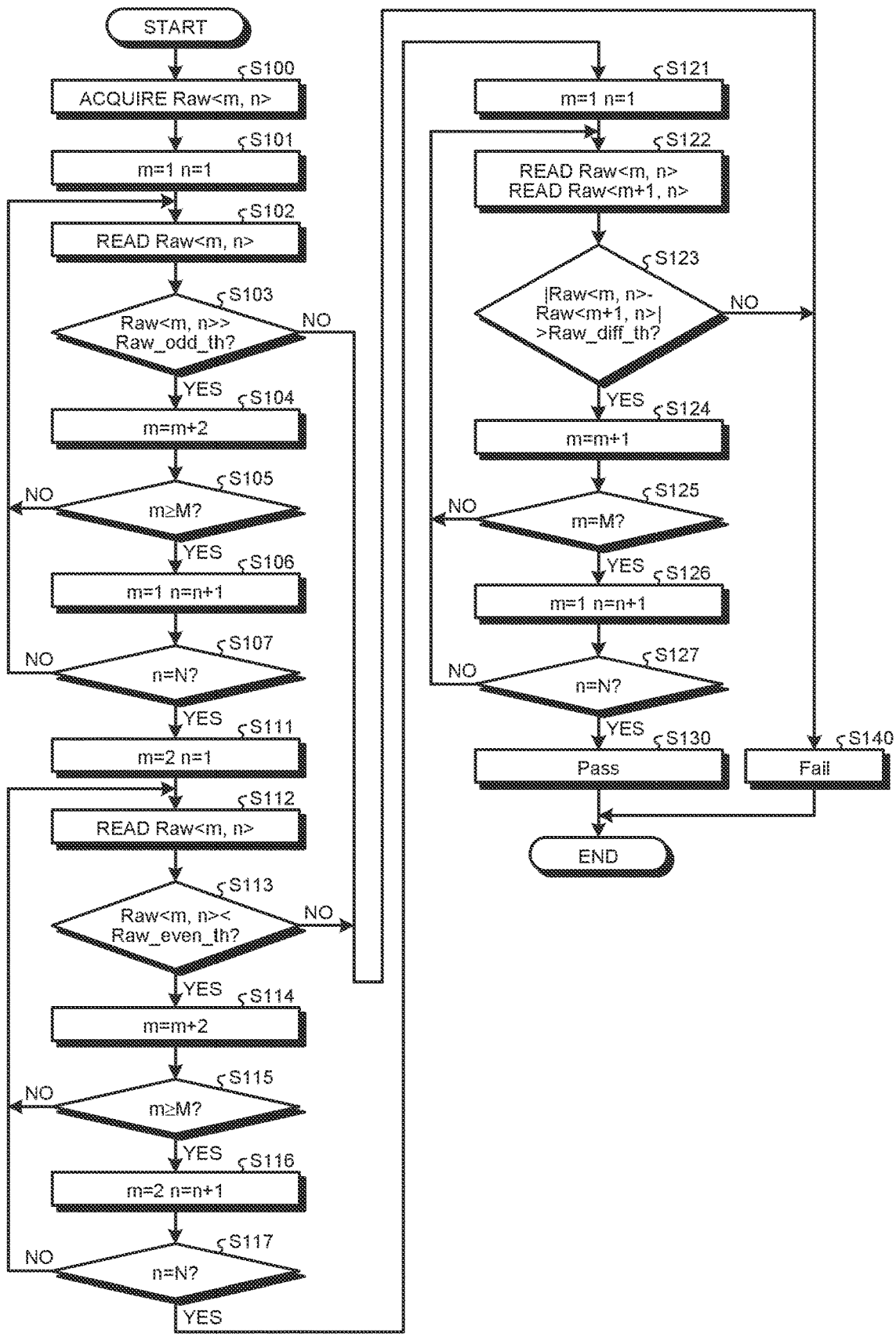
FIG. 12 is a flowchart illustrating an example of short-circuit detection processing according to the first embodiment.

The following describes the short-circuit detection processing according to the present embodiment with reference to FIG. 12. FIG. 12 is a flowchart illustrating an example of the short-circuit detection processing according to the first embodiment.

In the present embodiment, the control circuit 102 performs the short-circuit detection operation illustrated in FIG. 10 (FIG. 11) to acquire detection values Raw<m, n> at the detection elements 3<m, n> in the detection area AA (Step S100), and stores the acquired detection values Raw<m, n> in the storage circuit 46. In the control circuit 102, a first threshold Raw_odd_th for the detection values Raw<odd, n> at the detection elements 3<odd, n> in the odd-numbered columns, a second threshold Raw_even_th for the detection values Raw<even, n> at the detection elements 3<even, n> in the even-numbered columns, and a third threshold Raw_diff_th for absolute values of differences between the detection values Raw<odd, n> at the detection elements 3<odd, n> and the detection values Raw<even, n> at the detection elements 3<even, n>(|Raw<odd, n>−Raw<even, n>|) are set in advance.

After acquiring the detection values Raw<m, n> at the detection elements 3<m, n> in the detection area AA, the control circuit 102 first performs the following processing from Step S101 to Step S107 to perform comparative determination processing of the detection values Raw<odd, n> at the detection elements 3<odd, n> in all the odd-numbered columns in the detection area AA with respect to the first threshold Raw_odd_th.

The control circuit 102 sets m and n such that m=1 and n=1 (Step S101), reads the detection value Raw<m, n>(Step S102), and determines whether the detection value Raw<m, n> is higher than the first threshold Raw_odd_th (Raw<m, n>Raw_odd_th) (Step S103).

If the detection value Raw<m, n> is equal to or lower than the first threshold Raw_odd_th (Raw<m, n≥Raw_odd_th) (No at Step S103), the determination result is set to "Fail" (Step S140), indicating that a short-circuited point is present in the substrate 21, and the short-circuit detection processing ends.

If the detection value Raw<m, n> is higher than the first threshold Raw_odd_th (Raw<m, n>Raw_odd_th) (Yes at Step S103), the control circuit 102 sets m such that m=m+2 (Step S104), and determines whether m is equal to or larger than M (m≥M) (Step S105). If m is smaller than M (m<M) (No at Step S105), the process returns to Step S102. If m is equal to or larger than M (m≥M) (Yes at Step S105), the control circuit 102 sets m and n such that m=1 and n=n+1 (Step S106), and determines whether n is N (n=N) (Step S107). If n is smaller than N (n<N) (No at Step S107), the process returns to Step S102. If n is N (n=N) (Yes at Step S107), the process moves to the next Step S111.

By performing the processing from Step S101 to Step S107 described above, the comparative determination processing of the detection values Raw<odd, n> at the detection elements 3<odd, n> in all the odd-numbered columns in the detection area AA can be performed with respect to the first threshold Raw_odd_th.

After the comparative determination processing of the detection values Raw<odd, n> at the detection elements 3<odd, n> in all the odd-numbered columns in the detection area AA with respect to the first threshold Raw_odd_th, the following processing from Step S111 to Step S117 is subsequently performed to perform the comparative determination processing of the detection values Raw<even, n> at the detection elements 3<even, n> in all the even-numbered columns in the detection area AA with respect to the second threshold Raw_even_th.

The control circuit 102 sets m and n such that m=2 and n=1 (Step S111), reads the detection value Raw<m, n>(Step S112), and determines whether the detection value Raw<m, n> is lower than the second threshold Raw_even_th (Raw<m, n><Raw_even_th) (Step S113).

If the detection value Raw<m, n> is equal to or higher than the second threshold Raw_even_th (Raw<m, n>≥Raw_odd_th) (No at Step S113), the determination result is set to "Fail" (Step S140), indicating that a short-circuited point is present in the substrate 21, and the short-circuit detection processing ends.

If the detection value Raw<m, n> is lower than the second threshold Raweventh (Raw<m, n><Raw_odd_th) (Yes at Step S113), the control circuit 102 sets m such that m=m+2 (Step S114), and determines whether m is equal to or larger than M (m≥M) (Step S115). If m is smaller than M (m<M) (No at Step S115), the process returns to Step S112. If m is equal to or larger than M (m≥M) (Yes at Step S115), the control circuit 102 sets m and n such that m=2 and n=n+1 (Step S116), and determines whether n is N (n=N) (Step S117). If n is smaller than N (n<N) (No at Step S117), the process returns to Step S112. If n is N (n=N) (Yes at Step S117), the process moves to the next Step S121.

By performing the processing from Step S111 to Step S117 described above, the comparative determination processing of the detection values Raw<even, n> at the detection elements 3<even, n> in all the even-numbered columns in the detection area AA can be performed with respect to the second threshold Raw_even_th.

After the comparative determination processing of the detection values Raw<even, n> at the detection elements 3<even, n> in all the even-numbered columns in the detection area AA with respect to the second threshold Raw_even_th, the following processing from Step S121 to Step S127 is subsequently performed. Thereby, for the detection elements 3<m, n> adjacent to each other in the first direction Dx in the entire detection area AA, the comparative determination processing of absolute values of differences between the detection values Raw<m, n> at the detection elements 3<m, n> and the detection values Raw<m+1, n> at the detection elements 3<m+1, n>(|Raw<m, n>−Raw<m+1, n>|) is performed with respect to the third threshold Raw_diff_th.

The control circuit 102 sets m and n such that m=1 and n=1 (Step S121), reads the detection values Raw<m, n> and Raw<m+1, n>(Step S122), and determines whether the absolute value of the difference between the detection value Raw<m, n> and the detection value Raw<m+1, n>(|Raw<m, n>−Raw<m+1, n>|)) is higher than the third threshold Raw_diff_th (|Raw<m, n>−Raw<m+1, n>|>Raw_even_th) (Step S123).

If the absolute value of the difference between the detection value Raw<m, n> and the detection value Raw<m+1, n>(|Raw<m, n>−Raw<m+1, n>|)) is equal to or lower than the third threshold Raw_diff_th (|Raw<m, n>−Raw<m+1, n>|≤Raw_diff_th) (No at Step S123), the determination result is set to "Fail" (Step S140), indicating that a short-circuited point is present in the substrate 21, and the short-circuit detection processing ends.

If the absolute value of the difference between the detection value Raw<m, n> and the detection value Raw<m+1, n>(|Raw<m, n>−Raw<m+1, n>|) is higher than the third threshold Raw_diff_th (|Raw<m, n>−Raw<m+1, n>|>Raw_diff_th) (Yes at Step S123), the control circuit 102 sets m such that m=m+1 (Step S124), and determines whether m is M (m=M) (Step S125). If m is smaller than M (m<M) (No at Step S125), the process returns to Step S122. If m is M (m=M) (Yes at Step S125), the control circuit 102 sets m and n such that m=1 and n=n+1 (Step S126), and determines whether n is N (n=N) (Step S127). If n is smaller than N (n<N) (No at Step S127), the process returns to Step S122. If n is N (n=N) (Yes at Step S127), the determination result in the short-circuit detection processing according to the first embodiment is set to "Pass" (Step S130), indicating that no short-circuited point is present in the substrate 21, and the short-circuit detection processing ends.

The processing from Step S121 to Step S127 described above is performed. Thereby, for the detection elements 3<m, n> adjacent to each other in the first direction Dx in the entire detection area AA, the comparative determination processing of the absolute values of differences between the detection values Raw<m, n> at the detection elements 3<m, n> and the detection values Raw<m+1, n> at the detection elements 3<m+1, n>(|Raw<m, n>−Raw<m+1, n>|) can be performed with respect to the third threshold Raw_diff_th. By performing the short-circuit detection processing described above, the short circuits that have occurred in the manufacturing process of the substrate 21 can be accurately detected, and thus, the quality of the detection device 1 can be improved.

Second Embodiment

Figure 13:
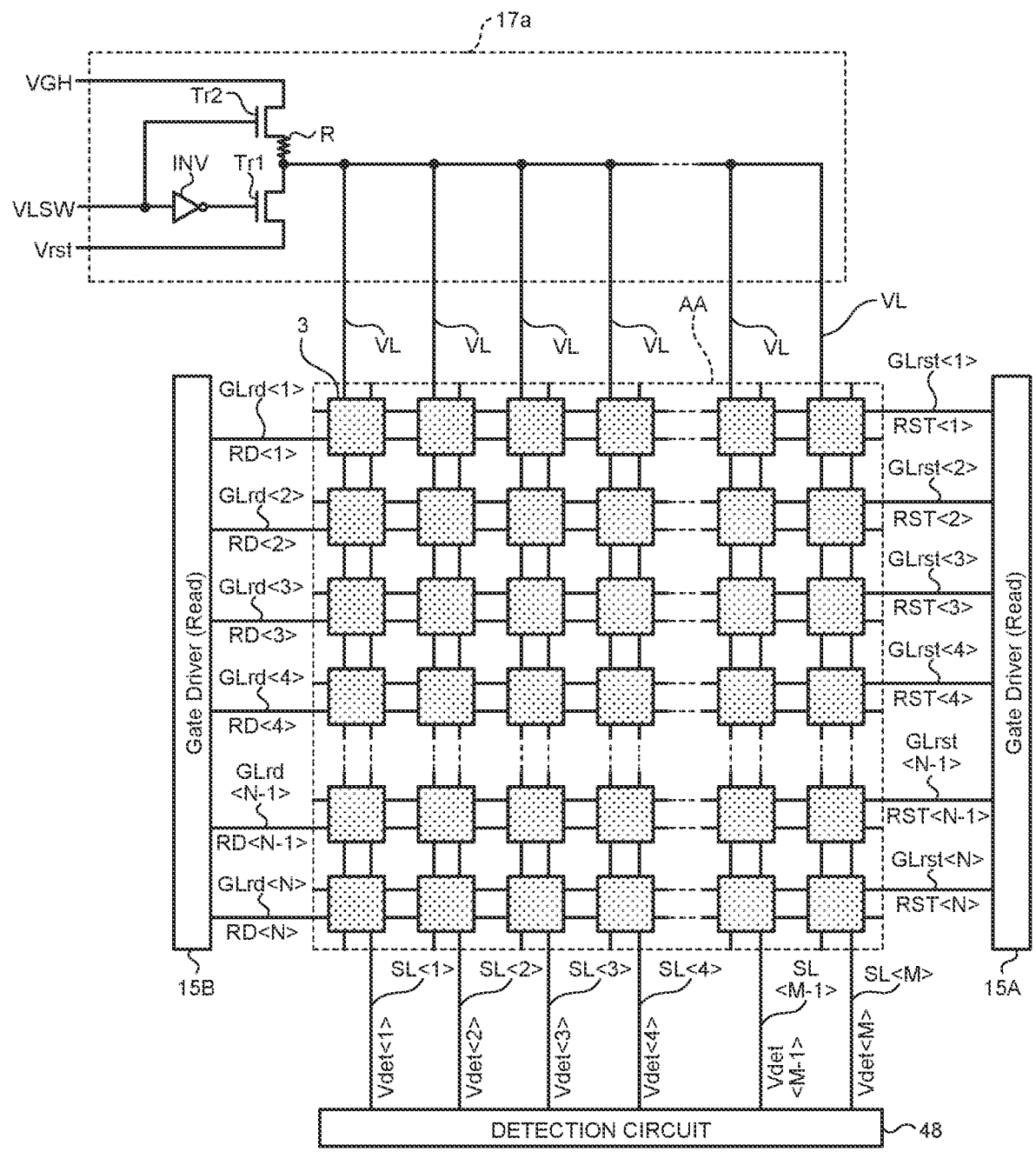
FIG. 13 is a diagram illustrating a configuration of an initialization circuit and a coupling example of the reset potential lines according to a second embodiment of the present invention.
Figure 14:
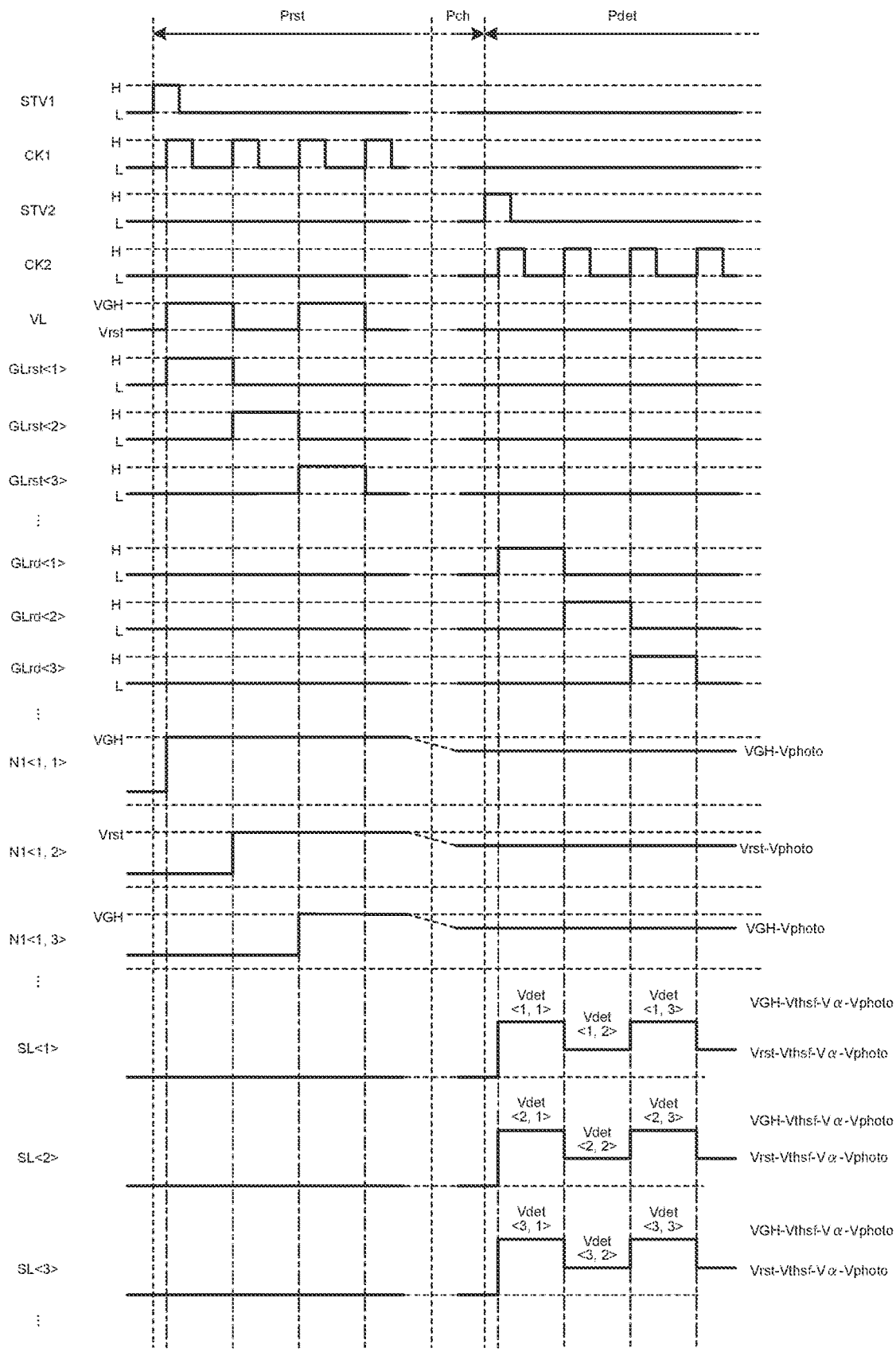
FIG. 14 is a diagram illustrating an exemplary timing diagram when the short circuit does not occur during the short-circuit detection operation of the detection device according to the second embodiment.
Figure 15:
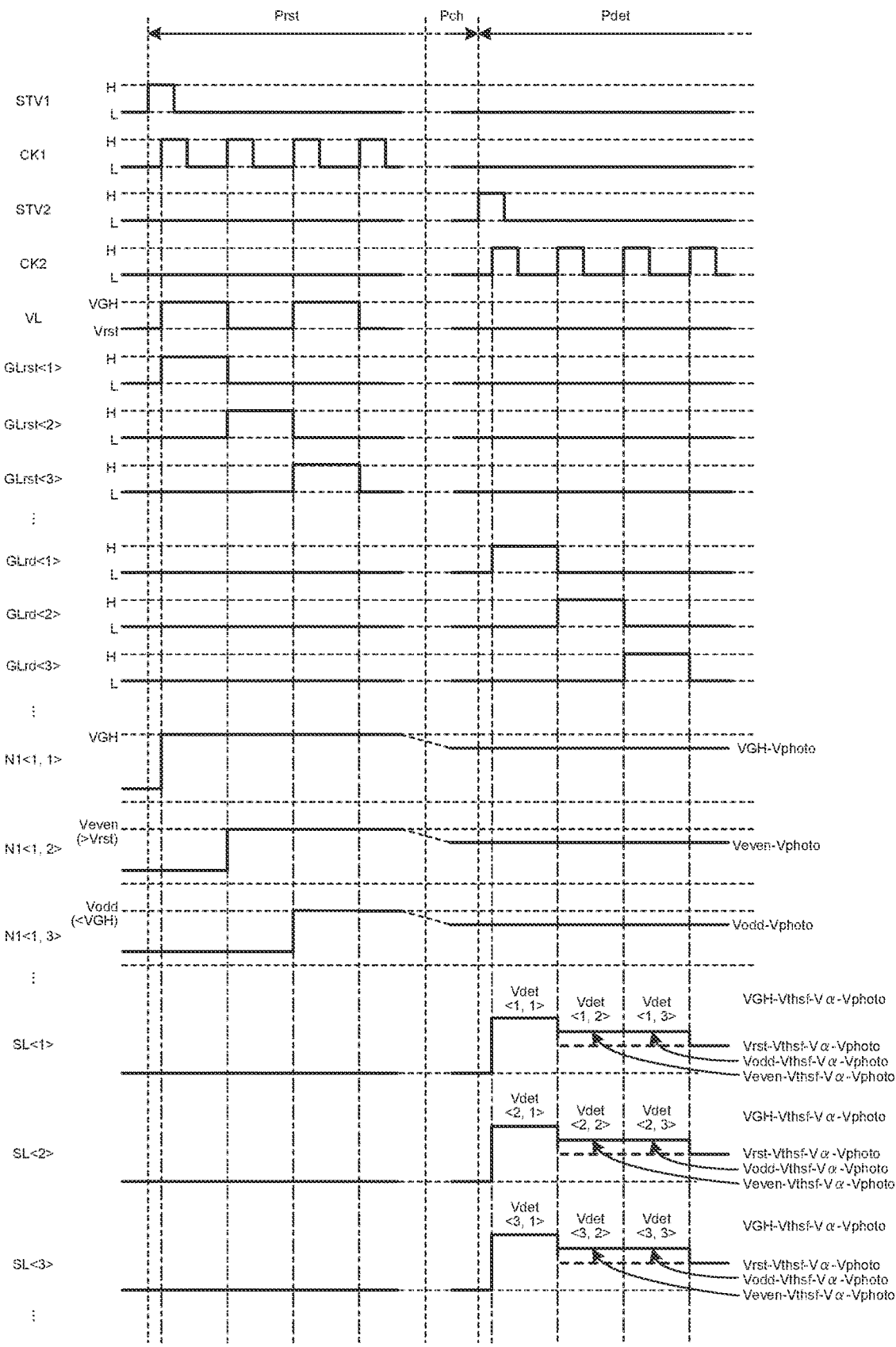
FIG. 15 is a diagram illustrating an exemplary timing diagram when the short circuit occurs during the short-circuit detection operation of the detection device according to the second embodiment.

In a second embodiment of the present invention, an aspect will be described in which the short circuits are detected between the detection elements 3 adjacent in the second direction Dy. FIG. 13 is a diagram illustrating a configuration of the initialization circuit and a coupling example of the reset potential lines according to the second embodiment. FIG. 14 is a diagram illustrating an exemplary timing diagram when the short circuit does not occur during the short-circuit detection operation of the detection device according to the second embodiment. FIG. 15 is a diagram illustrating an exemplary timing diagram when the short circuit occurs during the short-circuit detection operation of the detection device according to the second embodiment. Specifically, FIG. 15 illustrates an example in which the short circuit occurs between the detection element 3<1, 2> (detection element in the first column of the second row) and the detection element 3<1, 3> (detection element in the first column of the third row) that are adjacent to each other.

As illustrated in FIG. 13, an initialization circuit 17a includes the first transistor Tr1 that applies the first potential Vrst (first potential at, for example, 5 V) to the reset potential lines VL, the second transistor Tr2 that applies the second potential VGH (second potential at, for example, 10 V) higher than the first potential Vrst (first potential) to the reset potential lines VL, and the logic inversion circuit INV that inverts the control logic between the first transistor Tr1 and the second transistor Tr2. The first potential Vrst and the second potential VGH are supplied from the power supply circuit 103.

The second transistor Tr2 has, for example, a smaller channel width than that of the first transistor Tr1. As a result, the on-resistance R of the second transistor Tr2 increases. In an aspect of the present invention, the second transistor Tr2 may, for example, be provided with the external resistor R in the supply path of the second potential VGH (source or drain of the second transistor Tr2).

As illustrated in FIG. 13, the initialization circuit 17a receives the reset potential selection signal VLSW. The gate of the second transistor Tr2 receives the reset potential selection signal VLSW, and the gate of the first transistor Tr1 receives a signal obtained by the logic inversion circuit INV by logically inverting the reset potential selection signal VLSW. In an aspect of the present invention, the reset potential selection signal VLSW may, for example, be output from the detection control circuit 11 (refer to FIG. 4).

The reset potential selection signal VLSW is controlled to be "L" (low-level voltage) during the normal detection operation of the detection device 1. This operation applies the first potential Vrst to all the detection elements 3 to initialize the potential of the nodes N1 of all the detection elements 3 to the first potential Vrst during the reset period Prst.

In the present embodiment, as illustrated in FIGS. 14 and 15, in the reset period Prst during the short-circuit detection operation, the reset potential selection signal VLSW is controlled to be "H" (high-level voltage) when initializing the potentials N1<m, odd> of the nodes N1 of the detection elements 3<m, odd> in odd-numbered rows to the second potential VGH, and is controlled to be "L" (low-level voltage) when initializing the potentials N1<m, even> of the nodes N1 of the detection elements 3<m, even> in even-numbered rows to the first potential Vrst. As a result, the second potential VGH is applied to the detection elements 3 in the odd-numbered rows, and the first potential Vrst is applied to the detection elements 3 in the even-numbered rows.

During the short-circuit detection operation according to the second embodiment, the detection area AA is uniformly irradiated with the predetermined amount of light. If no short circuit occurs in the substrate 21, as illustrated in FIG. 14, during the reset period Prst, potentials N1<1, 1>, N1<1, 3>, . . . of the nodes N1 in the odd-numbered rows of the detection elements 3 are initialized to the second potential VGH, and potentials N1<1, 2>, . . . of the nodes N1 in the even-numbered rows of the detection elements 3 are initialized to the first potential Vrst. As a result, the potential of the detection signals Vdet<m, odd> of the detection elements 3<m, odd> in the odd-numbered rows is set to (VGH−Vthsf−Vα−Vphoto), and the potential of the detection signals Vdet<m, even> of the detection elements 3<m, even> in the even-numbered rows is set to (Vrst−Vthsf−Vα−Vphoto). The potential of the detection signals Vdet<m, odd> of the detection elements 3<m, odd> in the odd-numbered rows differs from the potential of the detection signals Vdet<m, even> of the detection elements 3<m, even> in the even-numbered rows by a potential difference of (|Vdet<m, odd>−Vdet<m, even>|=|VGH−Vrst|≈5 V) between the second potential VGH (for example, at 10 V) and the first potential Vrst (for example, at 5 V).

In contrast, if a short circuit occurs, for example, between the detection elements 3<1, 2> and 3<1, 3> adjacent to each other in the second direction Dy, potentials N1<m, 2>, . . . of the nodes N1 of the detection elements 3 in the second row are initialized to the potential Veven (>Vrst) higher than the first potential Vrst, and potentials N1<m, 3>, . . . of the nodes N1 of the detection elements 3 in the third row are initialized to the potential Vodd (<VGH) lower than the second potential VGH, during the reset period Prst, as illustrated in FIG. 15. In this case, the potential of the detection signals Vdet<m, 2> of the detection elements 3<m, 2> in the second row is set to (Veven−Vthsf−Vα−Vphoto), which is higher than the potential (Vrst−Vthsf−Vα−Vphoto) obtained when no short circuit occurs between the detection elements 3<1, 2> and 3<1, 3>. In addition, the potential of the detection signals Vdet<m, 3> of the detection elements 3<m, 3> in the third row is set to (Vodd−Vthsf−Vα−Vphoto), which is lower than the potential (VGH−Vthsf−Vα−Vphoto) obtained when no short circuit occurs between the detection elements 3<1, 2> and 3<1, 3>. Furthermore, the potential difference between the potential of the detection signals Vdet<m, 2> of the detection elements 3<m, 2> in the second row and the potential of the detection signals Vdet<m, 3> of the detection elements 3<m, 3> in the third row is smaller than the potential difference obtained when no short circuit occurs between the detection elements 3<1, 2> and 3<1, 3>(|Vdet<m, 2>−Vdet<m, 3>|=|Vodd−Veven|<5 V).

Figure 16:
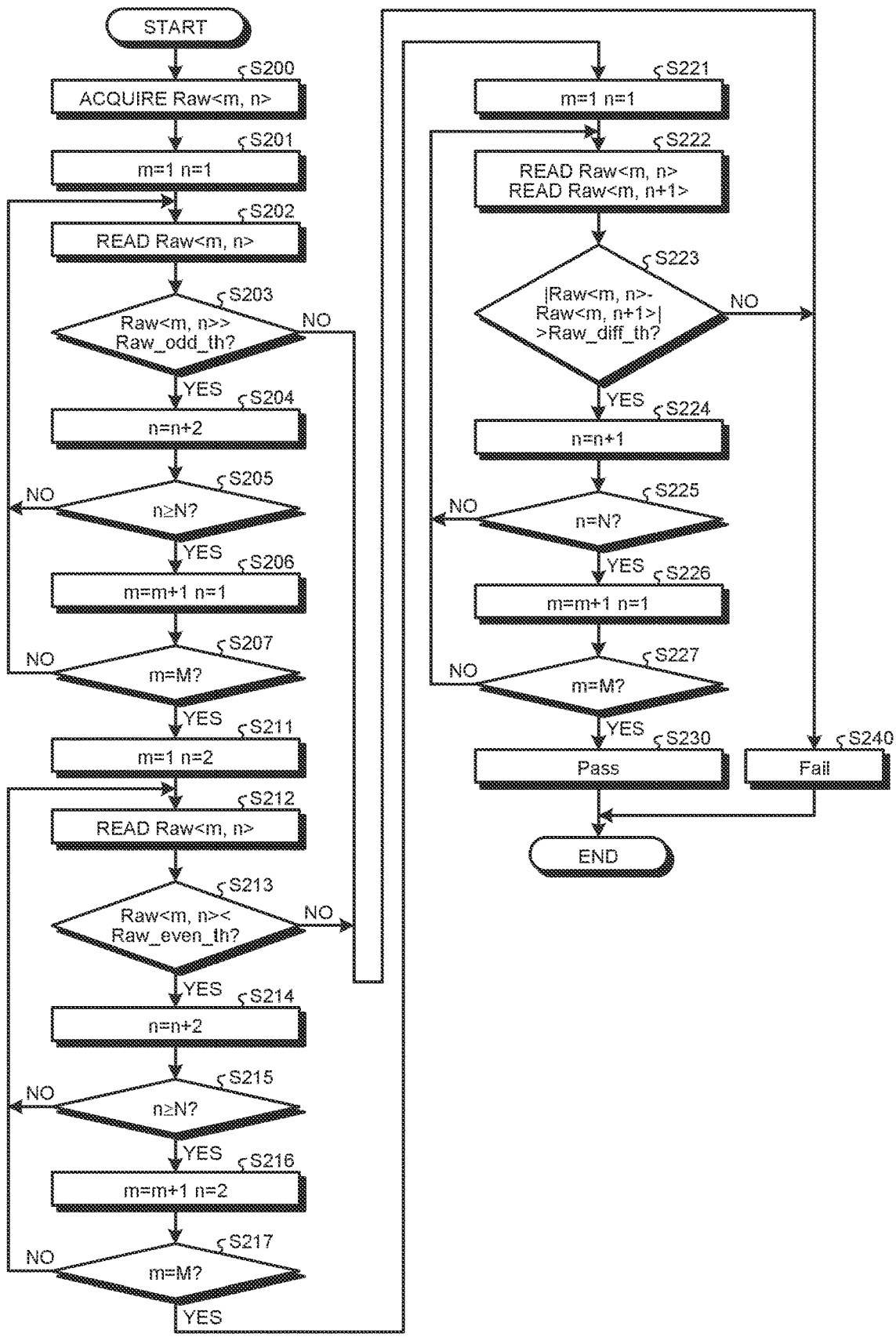
FIG. 16 is a flowchart illustrating an example of the short-circuit detection processing according to the second embodiment.

The following describes the short-circuit detection processing according to the present embodiment with reference to FIG. 16. FIG. 16 is a flowchart illustrating an example of the short-circuit detection processing according to the second embodiment.

In the present embodiment, the control circuit 102 performs the short-circuit detection operation illustrated in FIG. 14 (FIG. 15) to acquire the detection values Raw<m, n> at the detection elements 3<m, n> in the detection area AA (Step S200), and stores the acquired detection values Raw<m, n> in the storage circuit 46. In the control circuit 102, the first threshold Raw_odd_th for the detection values Raw<m, odd> at the detection elements 3<m, odd> in the odd-numbered rows, the second threshold Raw_even_th for the detection values Raw<m, even> at the detection elements 3<m, even> in the even-numbered rows, and the third threshold Raw_diff_th for absolute values of differences between the detection values Raw<m, odd> at the detection elements 3<m, odd> and the detection values Raw<m, even> at the detection elements 3<m, even>(|Raw<m, odd>−Raw<m, even>|) are set in advance.

After acquiring the detection values Raw<m, n> at the detection elements 3<m, n> in the detection area AA, the control circuit 102 first performs the following processing from Step S201 to Step S207 to perform the comparative determination processing of the detection values Raw<m, odd> at the detection elements 3<m, odd> in all the odd-numbered columns in the detection area AA with respect to the first threshold Raw_odd_th.

The control circuit 102 sets m and n such that m=1 and n=1 (Step S201), reads the detection value Raw<m, n>(Step S202), and determines whether the detection value Raw<m, n> is higher than the first threshold Raw_odd_th (Raw<m, n>Raw_odd_th) (Step S203).

If the detection value Raw<m, n> is equal to or lower than the first threshold Raw_odd_th (Raw<m, n>≤Raw_odd_th) (No at Step S203), the determination result is set to "Fail" (Step S240), indicating that a short-circuited point is present in the substrate 21, and the short-circuit detection processing ends.

If the detection value Raw<m, n> is higher than the first threshold Raw_odd_th (Raw<m, n>>Raw_odd_th) (Yes at Step S203), the control circuit 102 sets n such that n=n+2 (Step S204), and determines whether n is equal to or larger than N (n≥N) (Step S205). If n is smaller than N (n<N) (No at Step S205), the process returns to Step S202. If n is equal to or larger than N (n≥N) (Yes at Step S205), the control circuit 102 sets m and n such that m=m+1 and n=1 (Step S206), and determines whether m is M (m=M) (Step S207). If m is smaller than M (m<M) (No at Step S207), the process returns to Step S202. If m is M (m=M) (Yes at Step S207), the process moves to the next Step S211.

By performing the processing from Step S201 to Step S207 described above, the comparative determination processing of the detection values Raw<m, odd> at the detection elements 3<m, odd> in all the odd-numbered rows in the detection area AA can be performed with respect to the first threshold Raw_odd_th.

After the comparative determination processing of the detection values Raw<m, odd> at the detection elements 3<m, odd> in all the odd-numbered rows in the detection area AA with respect to the first threshold Raw_odd_th, the following processing from Step S211 to Step S217 is subsequently performed to perform the comparative determination processing of the detection values Raw<m, even> at the detection elements 3<m, even> in all the even-numbered rows in the detection area AA with respect to the second threshold Raw_even_th.

The control circuit 102 sets m and n such that m=1 and n=2 (Step S211), reads the detection value Raw<m, n> (Step S212), and determines whether the detection value Raw<m, n> is lower than the second threshold Raw_even_th (Raw<m, n><Raw_even_th) (Step S213).

If the detection value Raw<m, n> is equal to or higher than the second threshold Raw_even_th (Raw<m, n>≥Raw_odd_th) (No at Step S213), the determination result is set to "Fail" (Step S240), indicating that a short-circuited point is present in the substrate 21, and the short-circuit detection processing ends.

If the detection value Raw<m, n> is lower than the second threshold Raw_even_th (Raw<m, n><Raw_odd_th) (Yes at Step S213), the control circuit 102 sets n such that n=n+2 (Step S214), and determines whether n is equal to or larger than N (n≥N)(Step S215). If n is smaller than N (n<N) (No at Step S215), the process returns to Step S212. If n is equal to or larger than N (n≥N) (Yes at Step S215), the control circuit 102 sets m and n such that m=m+1 and n=2 (Step S216), and determines whether m is M (m=M) (Step S217). If m is smaller than M (m<M) (No at Step S217), the process returns to Step S212. If m is M (m=M) (Yes at Step S217), the process moves to the next Step S221.

By performing the processing from Step S211 to Step S217 described above, the comparative determination processing of the detection values Raw<even, n> at the detection elements 3<m, even> in all the even-numbered rows in the detection area AA can be performed with respect to the second threshold Raw_even_th.

After the comparative determination processing of the detection values Raw<m, even> at the detection elements 3<m, even> in all the even-numbered rows in the detection area AA with respect to the second threshold Raw_even_th, the following processing from Step S221 to Step S227 is subsequently performed. Thereby, for the detection elements 3<m, n> adjacent to each other in the second direction Dy in the entire detection area AA, the comparative determination processing of absolute values of differences between the detection values Raw<m, n> at the detection elements 3<m, n> and the detection values Raw<m, n+1> at the detection elements 3<m, n+1>(|Raw<m, n>−Raw<m, n+1>|) is performed with respect to the third threshold Raw_diff_th.

The control circuit 102 sets m and n such that m=1 and n=1 (Step S221), reads the detection values Raw<m, n> and Raw<m, n+1>(Step S222), and determines whether the absolute value of the difference between the detection value Raw<m, n> and the detection value Raw<m, n+1>(|Raw<m, n>−Raw<m, n+1>|)) is higher than the third threshold Raw_diff_th (|Raw<m, n>−Raw<m, n+1>|>Raw_even_th) (Step S223).

If the absolute value of the difference between the detection value Raw<m, n> and the detection value Raw<m, n+1>(|Raw<m, n>−Raw<m, n+1>|) is equal to or lower than the third threshold Raw_diff_th (|Raw<m, n>−Raw<m, n+1>|≤Raw_diff_th) (No at Step S223), the determination result is set to "Fail" (Step S240), indicating that a short-circuited point is present in the substrate 21, and the short-circuit detection processing ends.

If the absolute value of the difference between the detection value Raw<m, n> and the detection value Raw<m, n+1>(|Raw<m, n>−Raw<m, n+1>|) is higher than the third threshold Raw_diff_th (|Raw<m, n>−Raw<m, n+1>|>Raw_diff_th) (Yes at Step S223), the control circuit 102 sets n such that n=n+1 (Step S224), and determines whether n is N (n=N) (Step S225). If n is smaller than N (n<N) (No at Step S225), the process returns to Step S222. If n is N (n=N) (Yes at Step S225), the control circuit 102 sets m and n such that m=m+1 and n=1 (Step S226), and determines whether m is M (m=M) (Step S227). If m is smaller than M (m<M) (No at Step S227), the process returns to Step S222. If m is M (m=M) (Yes at Step S227), the determination result in the short-circuit detection processing according to the second embodiment is set to "Pass" (Step S230), indicating that no short-circuited point is present in the substrate 21, and the short-circuit detection processing ends.

The processing from Step S221 to Step S227 described above is performed. Thereby, for the detection elements 3<m, n> adjacent to each other in the second direction Dy in the entire detection area AA, the comparative determination processing of the absolute values of differences between the detection values Raw<m, n> at the detection elements 3<m, n> and the detection values Raw<m+1, n> at the detection elements 3<m+1, n>(|Raw<m, n>−Raw<m+1, n>|) can be performed with respect to the third threshold Raw_diff_th. By performing the short-circuit detection processing described above, the short circuits that have occurred in the manufacturing process of the substrate 21 can be accurately detected, and thus, the quality of the detection device 1 can be improved.

Third Embodiment

Figure 17:
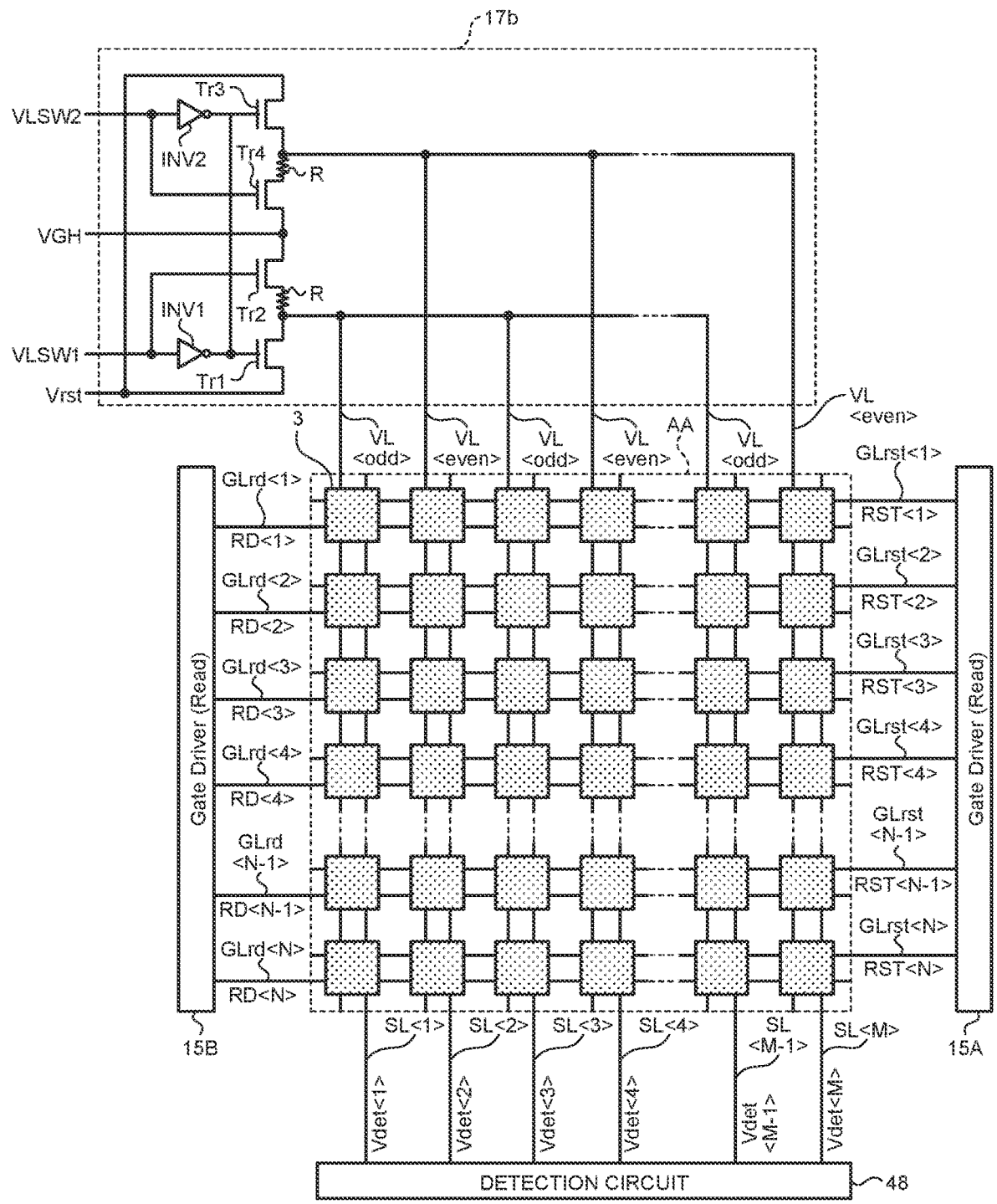
FIG. 17 is a diagram illustrating a configuration of an initialization circuit and a coupling example of the reset potential lines according to a third embodiment of the present invention.

In a third embodiment of the present invention, an aspect will be described in which the short circuits can be detected both between the detection elements 3 adjacent in the first direction Dx and between the output signal lines SL, and between the detection elements 3 adjacent in the second direction Dy. FIG. 17 is a diagram illustrating a configuration of an initialization circuit and a coupling example of the reset potential lines according to the third embodiment.

As illustrated in FIG. 17, an initialization circuit 17b includes the first transistor Tr1 that applies the first potential Vrst (at, for example, 5 V) to the reset potential lines VL<odd> in the odd-numbered columns, the second transistor Tr2 that applies the second potential VGH (at, for example, 10 V) higher than the first potential Vrst to the reset potential lines VL<odd> in the odd-numbered columns, a first logic inversion circuit INV1 that inverts the control logic between the first transistor Tr1 and the second transistor Tr2, a third transistor Tr3 that applies the first potential Vrst to the reset potential lines VL<even> in the even-numbered columns, a fourth transistor Tr4 that applies the second potential VGH to the reset potential lines VL<even> in the even-numbered columns, and a second logic inversion circuit INV2 that inverts the control logic between the third transistor Tr3 and the fourth transistor Tr4. The first potential Vrst and the second potential VGH are supplied from the power supply circuit 103.

The second and the fourth transistors Tr2 and Tr4 have, for example, smaller channel widths than those of the first and the third transistors Tr1 and Tr3. As a result, the on-resistance R of each of the second and the fourth transistors Tr2 and Tr4 increases. In an aspect of the present invention, the second and the fourth transistors Tr2 and Tr4 may, for example, be provided with the external resistors R in the supply paths of the second potential VGH (sources or drains of the second and the fourth transistors Tr2 and Tr4). Such an aspect causes the external resistors R to serve as current-limiting resistors to reduce the load on the power supply circuit 103 when the short circuit occurs in the substrate 21.

As illustrated in FIG. 17, the initialization circuit 17b receives a first reset potential selection signal VLSW1 and a second reset potential selection signal VLSW2. The gate of the second transistor Tr2 receives the first reset potential selection signal VLSW1, and the gate of the first transistor Tr1 receives a signal obtained by the logic inversion circuit INV1 by logically inverting the first reset potential selection signal VLSW1. The gate of the fourth transistor Tr4 receives the second reset potential selection signal VLSW2, and the gate of the third transistor Tr3 receives a signal obtained by the logic inversion circuit INV2 by logically inverting the second reset potential selection signal VLSW2. In an aspect of the present invention, the first and the second reset potential selection signals VLSW1 and VLSW2 may, for example, be output from the detection control circuit 11 (refer to FIG. 4).

The first and the second reset potential selection signals VLSW1 and VLSW2 are controlled to be "L" (low-level voltage) during the normal detection operation of the detection device 1. This operation initializes the potential of the nodes N1 of all the detection elements 3 to the first potential Vrst during the reset period Prst.

In the case of detecting the short circuits between the detection elements 3 adjacent in the first direction Dx and between the output signal lines SL, the first reset potential selection signal VLSW1 is controlled to be "H" (high-level voltage) and the second reset potential selection signal VLSW2 is controlled to be "L" (low-level voltage) during the entire period of the short-circuit detection operation. This operation applies the second potential VGH to the detection elements 3 in the odd-numbered columns, and applies the first potential Vrst to the detection elements 3 in the even-numbered columns. In this aspect, the short circuits can be detected between the detection elements 3 adjacent in the first direction Dx and between the output signal lines SL by performing the short-circuit detection processing according to the first embodiment.

In the case of detecting the short circuits between the detection elements 3 adjacent in the second direction Dy, in the reset period Prst during the short-circuit detection operation, the first and the second reset potential selection signals VLSW1 and VLSW2 are controlled to be "H" (high-level voltage) when initializing the potentials N1<m, odd> of the nodes N1 of the detection elements 3<m, odd> in the odd-numbered rows to the second potential VGH, and the first and the second reset potential selection signals VLSW1 and VLSW2 are controlled to be "L" (low-level voltage) when initializing the potentials N1<m, even> of the nodes N1 of the detection elements 3<m, even> in the even-numbered rows to the first potential Vrst. As a result, the second potential VGH is applied to the detection elements 3 in the odd-numbered rows, and the first potential Vrst is applied to the detection elements 3 in the even-numbered rows. In this aspect, the short circuits can be detected between the detection elements 3 adjacent in the second direction Dy by performing the short-circuit detection processing according to the second embodiment.

In the embodiments described above, the examples have been described in which the control circuit 102 performs the short-circuit detection processing. The present invention is, however, not limited to such examples. In an aspect of the present invention, for example, an external device coupled to the detection device 1 may perform the short-circuit detection processing in the manufacturing process, the inspection process, or the like of the detection device 1.

While the preferred embodiments of the present disclosure have been described above, the present disclosure is not limited to such embodiments. The content disclosed in the embodiments is merely an example, and can be variously modified within the scope not departing from the gist of the present disclosure. Any modifications appropriately made within the scope not departing from the gist of the present disclosure also naturally belong to the technical scope of the present disclosure.

What is claimed is:

1. A detection device comprising:
   a plurality of detection elements arranged in a matrix having a row-column configuration in a detection area of a substrate; and
   an initialization circuit configured to apply an initialization potential to each of the detection elements, wherein
   the initialization circuit has a first mode to apply a same initialization potential to all the detection elements and a second mode to apply different initialization potentials to the detection elements adjacent to each other.

2. The detection device according to claim 1, wherein the initialization circuit is configured to apply a first potential to the detection elements arranged in even-numbered columns and apply a second potential different from the first potential to the detection elements arranged in odd-numbered columns, in the second mode.

3. The detection device according to claim 2, wherein the initialization circuit comprises:
   a first transistor configured to apply the first potential to the detection elements arranged in the odd-numbered columns; and
   a second transistor configured to apply the second potential to the detection elements arranged in the odd-numbered columns.

4. The detection device according to claim 3, wherein the initialization circuit further comprises:
   a third transistor configured to apply the first potential to the detection elements arranged in the even-numbered columns; and
   a fourth transistor configured to apply the second potential to the detection elements arranged in the even-numbered columns.

5. The detection device according to claim 1, wherein the initialization circuit is configured to apply a first potential to the detection elements arranged in even-numbered rows and apply a second potential different from the first potential to the detection elements arranged in odd-numbered rows, in the second mode.

6. The detection device according to claim 5, wherein the initialization circuit comprises:
   a first transistor configured to apply the first potential to the detection elements; and
   a second transistor configured to apply the second potential to the detection elements.

7. The detection device according to claim 5, wherein the initialization circuit comprises:
   a first transistor configured to apply the first potential to the detection elements arranged in odd-numbered columns;
   a second transistor configured to apply the second potential to the detection elements arranged in the odd-numbered columns;
   a third transistor configured to apply the first potential to the detection elements arranged in even-numbered columns; and
   a fourth transistor configured to apply the second potential to the detection elements arranged in the even-numbered columns.

8. The detection device according to claim 1, wherein the detection element comprises:
   a photoelectric conversion element;
   a reset transistor configured to supply the initialization potential to a cathode of the photoelectric conversion element;
   a source follower transistor configured to output a signal corresponding to a potential generated by the photoelectric conversion element; and
   a read transistor configured to read an output signal of the source follower transistor.

9. A method for detecting a short circuit of a detection device comprising a plurality of detection elements arranged in a matrix having a row-column configuration in a detection area of a substrate, the method comprising:
   a first step of applying a first potential to the detection elements arranged in even-numbered columns, applying a second potential different from the first potential to the detection elements arranged in odd-numbered columns, and storing detection values at the detection elements; and
   a second step of determining a short circuit of the substrate based on the detection values.

10. The method according to claim 9, wherein the second step comprises determining that the short circuit is occurring in the substrate when any of the detection values of the detection elements arranged in the odd-numbered columns is equal to or lower than a first threshold.

11. The method according to claim 9, wherein the second step comprises determining that the short circuit is occurring in the substrate when any of the detection values of the detection elements arranged in the even-numbered columns is equal to or higher than a second threshold.

12. The method according to claim 9, wherein the second step comprises determining that the short circuit is occurring in the substrate when a difference between the detection values of two of the detection elements adjacent in a row direction is equal to or lower than a third threshold.

13. A method for detecting a short circuit of a detection device comprising a plurality of detection elements arranged in a matrix having a row-column configuration in a detection area of a substrate, the method comprising:
   a first step of applying a first potential to the detection elements arranged in even-numbered rows, applying a second potential different from the first potential to the detection elements arranged in odd-numbered rows, and storing detection values at the detection elements; and
   a second step of determining a short circuit of the substrate based on the detection values.

14. The method according to claim 13, wherein the second step comprises determining that the short circuit is occurring in the substrate when any of the detection values of the detection elements arranged in the odd-numbered rows is equal to or lower than a first threshold.

15. The method according to claim 13, wherein the second step comprises determining that the short circuit is occurring in the substrate when any of the detection values of the detection elements arranged in the even-numbered rows is equal to or higher than a second threshold.

16. The method according to claim 13, wherein the second step comprises determining that the short circuit is occurring in the substrate when a difference between the detection values of two of the detection elements adjacent in a column direction is equal to or lower than a third threshold.

* * * * *